United States Patent
Hosseini et al.

(10) Patent No.: US 11,206,643 B2
(45) Date of Patent: Dec. 21, 2021

(54) MONITORING UPLINK PREEMPTION INDICATION

(71) Applicant: QUALCOMM incorporated, San Diego, CA (US)

(72) Inventors: Seyedkianoush Hosseini, San Diego, CA (US); Chih-Ping Li, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 320 days.

(21) Appl. No.: 16/534,714

(22) Filed: Aug. 7, 2019

(65) Prior Publication Data
US 2020/0053723 A1 Feb. 13, 2020

Related U.S. Application Data

(60) Provisional application No. 62/717,653, filed on Aug. 10, 2018.

(51) Int. Cl.
*H04W 72/04* (2009.01)
*H04W 72/12* (2009.01)
*H04L 5/00* (2006.01)

(52) U.S. Cl.
CPC ... *H04W 72/0413* (2013.01); *H04W 72/1268* (2013.01); *H04L 5/0007* (2013.01)

(58) Field of Classification Search
CPC ... H04B 7/2656; H04L 1/0069; H04L 1/1887; H04L 5/001; H04L 5/0005; H04L 5/0007;
(Continued)

(56) References Cited

PUBLICATIONS

Apple Inc: "Discussion on Handling of UL Multiplexing of Transmissions with Different Reliability", 3GPP TSG RAN WG1 Meeting #92, 3GPP Draft; R1-1802289 Discussion on Handling of UL Multiplexing of Transmissions with Different Reliability Requirement, 3rd Generation Partnership Project (3GPP), Mobile Competence Centre; 650, Rou, vol. RAN WG1, No. Athens, Greece; Feb. 26, 2018-Mar. 2, 2018, Feb. 17, 2018 (Feb. 17, 2018), XP051397819, 5 Pages, Retrieved from the Internet: URL: http://www.3gpp.org/ftp/tsg%5Fran/WG1%5FRL1/TSGR1%5F92/Docs/ [retrieved on Feb. 17, 2018] Design Consideration for UL URLLC multiplex with eMBB; p. 2, paragraph 2, UL preemption for service multiplexing in TDD system; p. 4, paragraph 4.
(Continued)

*Primary Examiner* — Marsha D Banks Harold
*Assistant Examiner* — Dharmesh J Patel
(74) *Attorney, Agent, or Firm* — Holland & Hart LLP

(57) ABSTRACT

Methods, systems, and devices for wireless communications are described. An uplink preemption indication (PI) may be transmitted from a serving cell to a user equipment (UE), where the uplink PI indicates that uplink traffic is to be preempted. In some cases, the UE may communicate with the serving cell on a first component carrier (CC) according to a first time division duplexing (TDD) configuration, where the first TDD configuration includes uplink and downlink portions. The serving cell may transmit the uplink PI on a second CC, and the UE may monitor for and receive the uplink PI during downlink portions of the second CC during uplink portions of the first CC. In some cases, the UE may monitor the second CC in accordance with a frequency division duplexing (FDD) configuration. Additionally or alternatively, the UE may monitor the second CC in accordance with a second complementary TDD configuration.

30 Claims, 20 Drawing Sheets

(58) Field of Classification Search
CPC ... H04L 5/0048; H04L 5/0053; H04L 5/0055; H04L 5/0064; H04L 5/0092; H04L 27/2602; H04L 5/1469; H04L 47/245; H04W 72/1289; H04W 52/0216; H04W 72/00; H04W 72/04; H04W 72/10; H04W 72/14; H04W 72/042; H04W 72/044; H04W 72/0413; H04W 72/1242; H04W 72/1268; H04W 72/12; H04W 88/02; H04W 88/08

See application file for complete search history.

(56) References Cited

PUBLICATIONS

ETRI: "URLLC Based on Grant-Based Dynamic TDD", 3GPP TSG RAN WG1 Meeting #91, 3GPP Draft; R1-1720232 URLLC Based on Grant-Based Dynamic TDD—Final, 3rd Generation Partnership Project (3GPP), Mobile Competence Centre; 650, Route Des Lucioles; F-06921 Sophia-Antipolis Cedex; RAN WG1, Reno, USA; Nov. 27, 2017-Dec. 1, 2017, Nov. 18, 2017 (Nov. 18, 2017), pp. 1-4, XP051369868, Retrieved from the Internet: URL: http://www.3gpp.org/ftp/tsg%5Fran/WG1%5FRL1/TSGR1%5F91/Docs/ [retrieved on Nov. 18, 2017] Dynamic TDD; p. 1, paragraph 2—p. 2.

Huawei, et al., "On Pre-Emption Indication for DL Multiplexing of URLLC and eMBB", 3GPP TSG RAN WG1 Meeting #90bis, 3GPP Draft; R1-1717081, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, 15 Pages, XP051340272, Retrieved from the Internet: URL: http://www.3gpp.org/ftp/Meetings_3GPP_SYNC/RAN1/Docs/ [retrieved on Oct. 8, 2017] Configuration of Pre-emption Indication; p. 2, paragraph 2—p. 8.

International Search Report and Written Opinion—PCT/US2019/045690—ISA/EPo—dated Nov. 19, 2019 (184376WO).

LG Electronics: "Discussion on Multiplexing UL Transmission with Different Requirements", 3GPP TSG RAN WG1 Meeting #92, 3GPP Draft; R1-1804572 Discussion on Multiplexing UL Transmission with Different Requirements, 3rd Generation Partnership Project (3GPP), Mobile Competence Centre; 650, Route Des Lucioles; F-06921 S, RAN WG1, Athens, Greece; Feb. 26, 2018-Mar. 2, 2018, Apr. 15, 2018 (Apr. 15, 2018), 8 Pages, XP051426841, Retrieved from the Internet: URL: http://www.3gpp.org/ftp/Meetings%5F3GPP%5FSYNC/RAN1/Docs/ [retrieved on Apr. 15, 2018] Resource sharing for uplink data multiplexing; p. 2, paragraph 2—p. 3, Feasibility of resource sharing by dynamic indication; p. 3, paragraph 3—p. 5.

LG Electronics: "Remaining Issues on Pre-Emption Indication", 3GPP TSG RAN WG1 Meeting 91, 3GPP Draft; R1-1719934 Remaining Issues on Preemption Indication, 3rd Generation Partnership Project (3GPP), Mobile Competence Centre; 650, Route Des Lucioles; F-06921 Sophia-Antipolis Cedex; RAN WG1, Reno, USA; Nov. 27, 2017-Dec. 1, 2017, Nov. 18, 2017 (Nov. 18, 2017), 4 Pages, XP051369647, Retrieved from the Internet: URL: http://www.3gpp.org/ftp/tsg%5Fran/WG1%5FRL1/TSGR1%5F91/Docs/ [retrieved on Nov. 18, 2017] Monitoring periodicity of pre-emption indication; p. 2, paragraph 2.1.

Wilus Inc: "Remaining Issues on Pre-Emption Indication and UE Behavior", 3GPP TSG RAN WG1 Meeting #90bis, 3GPP Draft; R1-1718281_Final, 3rd Generation Partnership Project (3GPP), Mobile Competence Centre; 650, Route Des Lucioles; F-06921 Sophia-Antipolis Cedex; France, RAN WG1, Prague, CZ; Oct. 9, 2017-Oct. 13, 2017, Oct. 8, 2017 (Oct. 8, 2017), 7 Pages, XP051341463, Retrieved from the Internet: URL: http://www.3gpp.org/ftp/Meetings_3GPP_SYNC/RAN1/Docs/ [retrieved on Oct. 8, 2017] Contents in Pre-emption indication; p. 2, paragraph 2—p. 3.

MONITORING UPLINK PREEMPTION INDICATION

CROSS REFERENCE

The present Application for Patent claims the benefit of U.S. Provisional Patent Application No. 62/717,653 by HOSSEINI, et al., entitled "MONITORING UPLINK PREEMPTION INDICATION," filed Aug. 10, 2018, assigned to the assignee hereof, and expressly incorporated herein.

BACKGROUND

The following relates generally to wireless communications, and more specifically to monitoring for an uplink preemption indication (PI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communication systems may support services with diverse requirements simultaneously. However, different transmission techniques for communicating in a system may prevent a UE from monitoring for and receiving indications concerning shared system resources, which may cause interference for the low latency transmission or increase latency for transmitting/receiving the low latency transmission. Efficient techniques are desired for transmitting and monitoring for these types of indications.

SUMMARY

The described techniques relate to improved methods, systems, devices, and apparatuses that support monitoring for an uplink preemption indication (PI). Generally, the described techniques provide for identifying that an uplink PI is to be transmitted from a serving cell to a user equipment (UE), where the uplink PI indicates that uplink traffic on the UE is to be preempted. In some examples, the UE may communicate with the serving cell on a first component carrier (CC) according to a first time division duplexing (TDD) configuration, where the first TDD configuration includes uplink and/or downlink portions. The serving cell may transmit the uplink PI on a second CC, and, accordingly, the UE may monitor for the uplink PI during downlink portions of the second CC. The uplink PI may be applicable to the first CC or the second CC. Additionally, the UE may receive an indication to monitor for the uplink PI on the second CC. In some cases, the UE may monitor the second CC in accordance with a frequency division duplexing (FDD) configuration. Additionally or alternatively, the UE may monitor the second CC in accordance with a second TDD configuration, where the second TDD configuration includes uplink and/or downlink portions complementary to the uplink and/or downlink portions of the first TDD configuration (e.g., an uplink portion in the first TDD configuration corresponds to a downlink portion in the second TDD configuration and vice versa). If the UE receives the uplink PI in a downlink portion of the FDD configuration or the second TDD configuration, traffic in a corresponding (e.g., occurring at the same time) uplink portion of the first TDD configuration may be preempted.

In some cases, the UE may refrain from monitoring for the uplink PI based on various factors. For example, the UE may determine to refrain from monitoring for the uplink PI based on at least some uplink timing parameters for the UE being indicated in terms of symbols. Additionally or alternatively, the UE may determine to refrain from monitoring for the uplink PI based on not expecting a collision between uplink communications on the first carrier and an uplink communication from a second UE. For example, the no collision may be based on an identified timeline that accommodates the uplink communication from the second UE, the UE is scheduled to not transmit at the same time as the uplink communication from the second UE, or the uplink portions are reserved for anchor slots that are not allowed to be preempted by the uplink communication from the second UE. Additionally or alternatively, the UE may determine to refrain from monitoring for the uplink PI based on being a cell edge UE in relation to the serving cell. In some cases, the uplink PI may indicate for the UE to ignore the uplink PI (e.g., do nothing), refrain from transmitting an uplink transmission, or reduce an uplink transmission power.

A method of wireless communication at a UE is described. The method may include identifying that the UE is in communication with a serving cell via a first component carrier (CC) in accordance with a TDD configuration that includes one or more downlink portions and one or more uplink portions, identifying that the UE is configured to receive uplink PIs via a second CC, where the uplink PIs indicate that uplink traffic on the first CC is to be preempted, and determining whether to monitor the second component carrier for uplink PIs pertaining to the one or more uplink portions on the first CC.

An apparatus for wireless communication at a UE is described. The apparatus may include a processor, memory coupled with the processor, and instructions stored in the memory. The instructions may be executable by the processor to cause the apparatus to identify that the UE is in communication with a serving cell via a first CC in accordance with a TDD configuration that includes one or more downlink portions and one or more uplink portions, identify that the UE is configured to receive uplink PIs via a second CC, where the uplink PIs indicate that uplink traffic on the first CC is to be preempted, and determine whether to monitor the second component carrier for uplink PIs pertaining to the one or more uplink portions on the first CC.

Another apparatus for wireless communication at a UE is described. The apparatus may include means for identifying that the UE is in communication with a serving cell via a first CC in accordance with a TDD configuration that includes one or more downlink portions and one or more uplink portions, identifying that the UE is configured to receive uplink PIs via a second CC, where the uplink PIs indicate that uplink traffic on the first CC is to be preempted, and determining whether to monitor the second component carrier for uplink PIs pertaining to the one or more uplink portions on the first CC.

A non-transitory computer-readable medium storing code for wireless communication at a UE is described. The code may include instructions executable by a processor to identify that the UE is in communication with a serving cell via a first CC in accordance with a TDD configuration that includes one or more downlink portions and one or more uplink portions, identify that the UE is configured to receive uplink PIs via a second CC, where the uplink PIs indicate that uplink traffic on the first CC is to be preempted, and determine whether to monitor the second component carrier for uplink PIs pertaining to the one or more uplink portions on the first CC.

In some examples of the method, apparatuses, and non-transitory computer-readable medium described herein, determining whether to monitor the second component carrier for uplink PIs pertaining to the one or more uplink portions on the first CC may include operations, features, means, or instructions for determining to monitor for uplink PIs based on a received indication.

Some examples of the method, apparatuses, and non-transitory computer-readable medium described herein may further include operations, features, means, or instructions for monitoring for uplink PIs transmitted via the second CC in accordance with an FDD configuration, such that the uplink PIs may be received via the second CC during the one or more uplink portions of the TDD configuration.

Some examples of the method, apparatuses, and non-transitory computer-readable medium described herein may further include operations, features, means, or instructions for monitoring, during at least one uplink portion of the one or more uplink portions of the TDD configuration one or more uplink portions of the TDD configuration identified for the first CC), which may be a first TDD configuration, for uplink PIs transmitted via the second CC in accordance with a second TDD configuration that includes downlink portions during the one or more uplink portions of the first TDD configuration, where the monitoring may be of the downlink portions of the second TDD configuration.

Some examples of the method, apparatuses, and non-transitory computer-readable medium described herein may further include operations, features, means, or instructions for monitoring for uplink PIs via both the first CC and the second CC during the one or more downlink portions of the TDD configuration and monitoring for uplink PIs via the second CC during the one or more uplink portions.

Some examples of the method, apparatuses, and non-transitory computer-readable medium described herein may further include operations, features, means, or instructions for monitoring for uplink PIs via the first CC during the one or more downlink portions of the TDD configuration, refraining from monitoring for uplink PIs via the second CC during the one or more downlink portions of the TDD configuration, and monitoring for uplink PIs via the second CC during the one or more uplink portions.

In some examples of the method, apparatuses, and non-transitory computer-readable medium described herein, determining whether to monitor the second component carrier for uplink PIs pertaining to the one or more uplink portions on the first CC may include operations, features, means, or instructions for identifying that at least some uplink timing parameters are indicated to the UE in terms of symbols and determining to refrain from monitoring for uplink PIs based on the at least some uplink timing parameters being indicated in terms of symbols and being within a threshold amount of an uplink PI timing.

In some examples of the method, apparatuses, and non-transitory computer-readable medium described herein, identifying that the at least some uplink timing parameters are indicated to the UE in terms of symbols may include operations, features, means, or instructions for receiving an explicit indication of the at least some uplink timing parameters via either radio resource control (RRC) signaling or downlink control information (DCI) signaling.

In some examples of the method, apparatuses, and non-transitory computer-readable medium described herein, identifying that the at least some uplink timing parameters are indicated to the UE in terms of symbols may include operations, features, means, or instructions for identifying the at least some uplink timing parameters based on a number of associated resource blocks, a number of associated CCs, a number of associated layers, a number of associated control symbols, a location of a demodulation reference signal, or combinations thereof.

In some examples of the method, apparatuses, and non-transitory computer-readable medium described herein, determining to refrain from monitoring for uplink PI may include operations, features, means, or instructions for determining to refrain from monitoring for uplink PI on a per CC basis.

In some examples of the method, apparatuses, and non-transitory computer-readable medium described herein, determining whether to monitor the second component carrier for uplink PIs pertaining to the one or more uplink portions on the first CC may include operations, features, means, or instructions for identifying that a collision between an uplink transmission of the UE during the one or more uplink portions and a preempting uplink transmission of another UE during the same one or more uplink portions may be not expected and determining to refrain from monitoring for uplink PIs based on an expectation that no collisions will occur during the one or more uplink portions.

In some examples of the method, apparatuses, and non-transitory computer-readable medium described herein, identifying that a collision may be not expected may include operations, features, means, or instructions for identifying that a timeline for communications by the other UE precludes uplink transmissions during the one or more uplink portions.

In some examples of the method, apparatuses, and non-transitory computer-readable medium described herein, identifying that a collision may be not expected may include operations, features, means, or instructions for identifying that the UE may be not scheduled to transmit an uplink transmission during the one or more uplink portions.

In some examples of the method, apparatuses, and non-transitory computer-readable medium described herein, identifying that a collision may be not expected may include operations, features, means, or instructions for identifying that the one or more uplink portions may be anchor slots for lower priority traffic, such that higher priority traffic may be not allowed to preempt lower priority traffic during the anchor slots.

In some examples of the method, apparatuses, and non-transitory computer-readable medium described herein, determining whether to monitor the second component carrier for uplink PIs pertaining to the one or more uplink portions on the first CC may include operations, features, means, or instructions for identifying that the UE may be near a cell edge of the serving cell and determining to refrain from monitoring for uplink PIs based on the UE being near the cell edge of the serving cell.

In some examples of the method, apparatuses, and non-transitory computer-readable medium described herein, identifying that the UE may be near the cell edge of the serving cell may include operations, features, means, or instructions for determining whether communications between the UE and the serving cell satisfy a path-loss threshold, or whether an estimate of an uplink receive power of uplink transmissions by the UE to the serving cell satisfy an uplink receive power threshold.

In some examples of the method, apparatuses, and non-transitory computer-readable medium described herein, the uplink PIs may be received as part of a multicast message.

In some examples of the method, apparatuses, and non-transitory computer-readable medium described herein, the multicast message may be associated with either a timing advance (TA) group or a transmit power control (TPC) group.

In some examples of the method, apparatuses, and non-transitory computer-readable medium described herein, the uplink PIs may be indicated via a same DCI message that may be used to indicate downlink PIs.

In some examples of the method, apparatuses, and non-transitory computer-readable medium described herein, the uplink PIs may be indicated via a first DCI message that may be different from a second DCI message used to indicate downlink PIs.

In some examples of the method, apparatuses, and non-transitory computer-readable medium described herein, the uplink PIs include a smaller payload than downlink PIs.

In some examples of the method, apparatuses, and non-transitory computer-readable medium described herein, the uplink PIs may be coded via Reed-Muller coding.

Some examples of the method, apparatuses, and non-transitory computer-readable medium described herein may further include operations, features, means, or instructions for receiving an uplink PI if the UE determines to monitor for uplink PIs during the one or more uplink portions and identifying whether to ignore the uplink PI, refrain from transmitting an uplink transmission based on receiving the uplink PI, or reduce an uplink transmission power based on receiving the uplink PI.

Some examples of the method, apparatuses, and non-transitory computer-readable medium described herein may further include operations, features, means, or instructions for receiving, via RRC signaling, an indication of an amount by which the uplink transmission power may be to be reduced.

In some examples of the method, apparatuses, and non-transitory computer-readable medium described herein, the uplink PI further indicates in which slot the UE is to refrain from transmitting an uplink transmission.

A method of wireless communication at a serving cell is described. The method may include identifying that the serving cell is to transmit an uplink PI via a CC, where the uplink PI indicates that uplink traffic to the serving cell is to preempt transmission of uplink traffic from a UE and transmitting the uplink PI such that the UE operating in accordance with a TDD configuration that includes one or more downlink portions and one or more uplink portions is able to monitor for the uplink PI during the one or more uplink portions of the TDD configuration.

An apparatus for wireless communication at a serving cell is described. The apparatus may include a processor, memory coupled with the processor, and instructions stored in the memory. The instructions may be executable by the processor to cause the apparatus to identify that the serving cell is to transmit an uplink PI via a CC, where the uplink PI indicates that uplink traffic to the serving cell is to preempt transmission of uplink traffic from a UE and transmit the uplink PI such that the UE operating in accordance with a TDD configuration that includes one or more downlink portions and one or more uplink portions is able to monitor for the uplink PI during the one or more uplink portions of the TDD configuration.

Another apparatus for wireless communication at a serving cell is described. The apparatus may include means for identifying that the serving cell is to transmit an uplink PI via a CC, where the uplink PI indicates that uplink traffic to the serving cell is to preempt transmission of uplink traffic from a UE and transmitting the uplink PI such that the UE operating in accordance with a TDD configuration that includes one or more downlink portions and one or more uplink portions is able to monitor for the uplink PI during the one or more uplink portions of the TDD configuration.

A non-transitory computer-readable medium storing code for wireless communication at a serving cell is described. The code may include instructions executable by a processor to identify that the serving cell is to transmit an uplink PI via a CC, where the uplink PI indicates that uplink traffic to the serving cell is to preempt transmission of uplink traffic from a UE and transmit the uplink PI such that the UE operating in accordance with a TDD configuration that includes one or more downlink portions and one or more uplink portions is able to monitor for the uplink PI during the one or more uplink portions of the TDD configuration.

In some examples of the method, apparatuses, and non-transitory computer-readable medium described herein, transmitting the uplink PI may include operations, features, means, or instructions for transmitting the uplink PI in accordance with an FDD configuration, such that the UE can monitor for the uplink PI during the one or more uplink portions of the TDD configuration.

In some examples of the method, apparatuses, and non-transitory computer-readable medium described herein, transmitting the uplink PI may include operations, features, means, or instructions for transmitting the uplink PI on a downlink portion of a second TDD configuration, where the TDD configuration on which the UE may be operating may be a first TDD configuration, and where the downlink portion of the second TDD configuration overlaps with the one or more uplink portions of the first TDD configuration.

Some examples of the method, apparatuses, and non-transitory computer-readable medium described herein may further include operations, features, means, or instructions for transmitting at least some uplink timing parameters in terms of symbols via RRC signaling, where the at least some uplink timing parameters may be within a threshold amount of an uplink PI timing.

In some examples of the method, apparatuses, and non-transitory computer-readable medium described herein, transmitting the uplink PI may include operations, features, means, or instructions for transmitting the uplink PI as part of a multicast message.

In some examples of the method, apparatuses, and non-transitory computer-readable medium described herein, the multicast message may be associated with either a TA group or a TPC group.

In some examples of the method, apparatuses, and non-transitory computer-readable medium described herein, transmitting the uplink PI may include operations, features, means, or instructions for transmitting the uplink PI via a same DCI message that may be used to indicate downlink PIs.

In some examples of the method, apparatuses, and non-transitory computer-readable medium described herein, transmitting the uplink PI may include operations, features, means, or instructions for transmitting the uplink PI via a DCI message that may be different than that used to indicate downlink PIs.

In some examples of the method, apparatuses, and non-transitory computer-readable medium described herein, the uplink PI includes a smaller payload than downlink PIs.

In some examples of the method, apparatuses, and non-transitory computer-readable medium described herein, the uplink PI may be coded via Reed-Muller coding.

In some examples of the method, apparatuses, and non-transitory computer-readable medium described herein, the uplink PI includes an indication of whether the UE may be to ignore the uplink PI, refrain from transmitting an uplink transmission based on receiving the uplink PI, or reduce an uplink transmission power based on receiving the uplink PI.

In some examples of the method, apparatuses, and non-transitory computer-readable medium described herein, the uplink PI further indicates in which slot the UE is to refrain from transmitting an uplink transmission.

DETAILED DESCRIPTION

Figure 1:
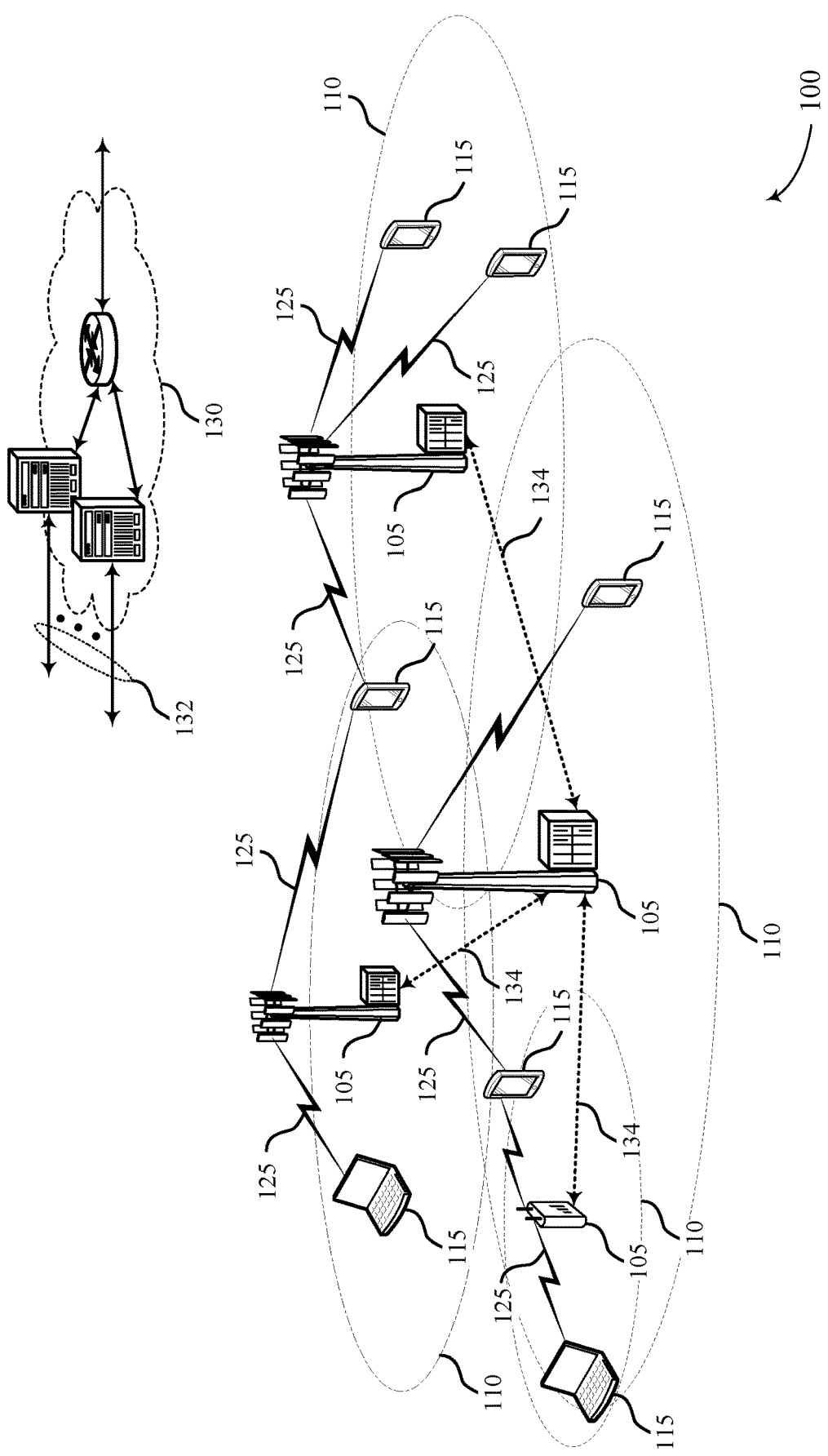
FIG. 1 illustrates an example of a system for wireless communications that supports monitoring for an uplink preemption indication in accordance with aspects of the present disclosure.

Some wireless communication systems may support services with diverse requirements simultaneously. For example, enhanced mobile broadband (eMBB) and ultra-reliable low latency communication (URLLC) services may operate within a wireless communication system, and resource allocation may need to accommodate requirements (e.g., reliability and latency) of both services. In some cases, communications associated with a first service (e.g., URLLC) may preempt other services in the system to meet the reliability and latency requirements for the first service. For example, a low latency (e.g., URLLC) transmission may take precedence within the system whenever identified to be transmitted and utilize resources that had been intended for other transmissions (e.g., eMBB uplink channels) to meet latency requirements for the low latency transmission. Accordingly, a serving cell may transmit a pre-emption indication (PI) indicating an upcoming low latency transmission to one or more UEs in the system, enabling the one or more UEs to suspend transmissions on resources for the low latency transmission. However, different transmission techniques (e.g., time division duplexing) for communicating with the serving cell may prevent a UE from monitoring for and receiving the PI, which may cause interference for the low latency transmission or increase latency for transmitting/receiving the low latency transmission. Techniques are described for transmitting and monitoring for a PI to maintain low latency transmissions in a wireless communication system, which may include various technologies.

Various technologies may support the different resource allocations for the different services. For example, frequency division duplexing (FDD) may allocate downlink resources and uplink resources separately in a same time span based on blocks of one or more continuous frequency channels for each transmission direction (e.g., downlink and uplink). As such, a user equipment (UE) may monitor and receive the downlink resources when simultaneously transmitting on the uplink resources. Additionally or alternatively, time division duplexing (TDD) may allocate downlink resources and uplink resources within separate time spans for a same set of one or more continuous frequency channels. For example, a first time span for the set of continuous frequency channels may be allocated for a first transmission direction (e.g., uplink), and a second time span for the set of continuous frequency channels may be allocated for a second transmission direction that is the same or different than the first transmission direction (e.g., downlink or uplink).

Based on the TDD, the UE may refrain from monitoring or receiving downlink resources when transmitting on the uplink resources because one transmission direction may be supported at a time. In some cases, a serving cell (e.g., a base station) may have to wait for a downlink time span to send information to a UE when utilizing TDD. For example, the serving cell may wait for a downlink portion to send a PI and subsequent scheduling information to the UE. In some cases, the UE may be an eMBB device, and the PI may indicate that one or more resources allocated for transmitting uplink eMBB traffic is preempted by incoming URLLC traffic in the system. Techniques that allow a serving cell to send information to a UE without having to wait for a downlink slot may improve system performance.

In some cases, downlink FDD cells may be paired with a first TDD cell allowing the serving cell to transmit information for the first TDD cell on the FDD downlink cell without having to wait for a downlink time span. In other examples, a second TDD cell may utilize complementary uplink and downlink scheduling patterns. These complementary patterns may provide the serving cell with a channel available for transmitting uplink information (e.g., a PI) for the first TDD cell without having to wait for a downlink time span. As such, a PI may be transmitted on a downlink portion for the FDD cell or the second TDD cell to indicate preempted resources on an uplink portion of the first TDD cell when a transmission is identified that preempts resources on the first TDD cell. Additionally or alternatively, a UE may refrain from monitoring for the PI based on uplink timings for the UE in relation to the preempting transmission, not expecting a collision between the preempting transmission and uplink transmissions on the first TDD cell, being a cell edge UE, or a combination thereof. In some cases, the uplink PI may indicate for the UE to ignore the uplink PI (e.g., do nothing), refrain from transmitting an uplink transmission, or reduce an uplink transmission power.

Aspects of the disclosure are initially described in the context of a wireless communications system. Additional wireless communications systems, a resource preemption example, and a PI transmission are then provided to describe additional aspects of the disclosure. Aspects of the disclosure are further illustrated by and described with reference to apparatus diagrams, system diagrams, and flowcharts that relate to monitoring for an uplink PI.

FIG. 1 illustrates an example of a wireless communications system 100 that supports monitoring for an uplink PI in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas.

Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs) and one or more uplink CCs according to a carrier aggregation configuration. Carrier aggregation may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems, a UE 115 may support various techniques for communicating with a serving cell. As described above, the UE 115 may support CA, where multiple CCs on the serving cell are utilized for the communications between the UE 115 and the serving cell. In some cases, each CC may be associated with a single duplexing scheme. For example, each CC may utilize an FDD or a TDD configuration for allocating resources for different transmission directions (e.g., uplink and downlink transmissions). An FDD configuration for a CC may include a mode of bidirectional communication in which transmission and reception take place at the same time on different carrier frequencies.

Additionally or alternatively, a TDD configuration for a CC may include a mode of bidirectional communication in which transmissions in each direction take place on the same carrier frequency but in different time slots. Carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry uplink or downlink traffic, and special subframes may be used to switch between downlink and uplink transmission. Allocation of uplink and downlink subframes within radio frames may be symmetric or asymmetric and may be statically determined or may be reconfigured semi-statically. Special subframes may carry downlink or uplink traffic and may include a Guard Period (GP) between downlink and uplink traffic. Switching from uplink to downlink traffic may be achieved by setting a timing advance at the UE 115 without the use of special subframes or a guard period. Uplink-downlink configurations with switch-point periodicity equal to the frame period (e.g., 10 ms) or half of the frame period (e.g., 5 ms) may also be supported. For example, TDD frames may include one or more special frames, and the period between special frames may determine the TDD downlink-to-uplink switch-point periodicity for the frame. Use of TDD offers flexible deployments without requiring paired uplink-downlink spectrum resources. In some TDD network deployments, interference may be caused between uplink and downlink communications (e.g., interference between uplink and downlink communication from different base stations or cells, interference between uplink and downlink communications from base stations/cells and UEs, etc.). For example, where different cells (e.g., base stations 105) serve different UEs 115 within overlapping coverage areas according to different TDD uplink-downlink configurations, a UE 115 attempting to receive and decode a downlink transmission from a serving cell can experience interference from uplink transmissions from other, proximately located UEs 115.

In some cases, the uplink transmissions associated with a first service type (e.g., URLLC) may preempt resources originally scheduled for a second service type (e.g., eMBB) with a lower priority than the first service type, such that the uplink transmissions associated with the first service type experiences less interference from uplink transmissions associated with the second service type. For example, the first service type may have stringent latency bounds (e.g., 1 ms). As such, transmissions associated with the first service type (e.g., low latency transmissions) may take precedence over other service type transmissions to meet the associated latency requirements. A serving cell may transmit a PI to UEs 115 within its serving area indicating that an upcoming transmission may preempt at least a portion of resources to enable the UEs 115 to suspend communications in the corresponding resources to reduce interference on the upcoming transmissions. However, as described above, one or more CCs that a UE 115 is utilizing may be configured for TDD operations. As such, if the UE 115 is currently in an uplink portion of the TDD configuration, the UE 115 may be unable to monitor for or receive any downlink transmissions (e.g., the PI) from the serving cell, which may affect the latency and/or reliability of the upcoming transmission associated with the latency requirements.

Wireless communications system 100 may support efficient techniques for signaling an uplink PI to a UE 115 configured with a first TDD configuration on a first CC of a serving cell. In some cases, the first TDD configuration on the first cell may be paired with an FDD configuration on a second CC (e.g., of the serving cell). Accordingly, the uplink PI may be transmitted during a downlink portion of the FDD configuration coinciding with an uplink portion of the first TDD configuration, enabling the UE 115 to monitor for and receive the uplink PI on the second CC while still being in an uplink portion on the first CC. Additionally or alternatively, the first TDD configuration may be paired with a second TDD configuration on the second CC, where the second TDD configuration is complementary to the first TDD configuration (e.g., an uplink portion in the first TDD configuration corresponds to a downlink portion in the second TDD configuration). As such, the uplink PI may be transmitted during a downlink portion of the second TDD configuration coinciding with an uplink portion of the first TDD configuration, enabling the UE 115 to monitor for and receive the uplink PI on the second CC while still being in an uplink portion on the first CC.

Additionally or alternatively, the UE 115 may determine to refrain from monitoring for the uplink PI based on uplink timings for the UE 115 in relation to the preempting transmission (e.g., URLLC transmission), not expecting a collision between the preempting transmission and uplink transmissions on the first CC with the first TDD configuration, being a cell edge UE, or a combination thereof. In some cases, the uplink PI may indicate for the UE 115 to ignore the uplink PI (e.g., do nothing), refrain from transmitting an uplink transmission, or reduce an uplink transmission power.

Figure 2A:
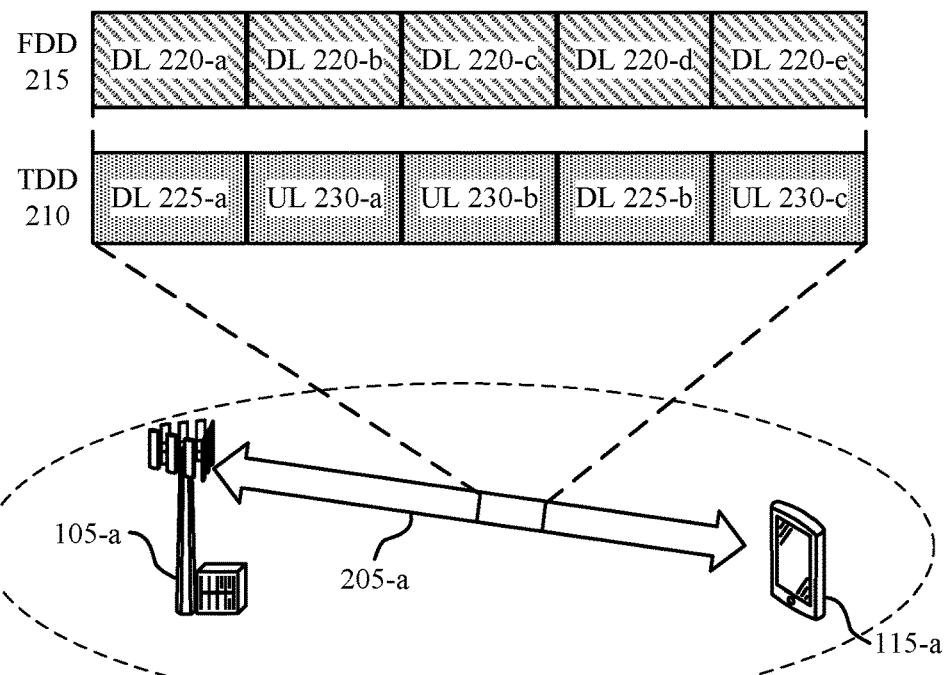
FIGS. 2A and 2B illustrate examples of wireless communications systems that support monitoring for an uplink PI in accordance with aspects of the present disclosure.
Figure 2B:
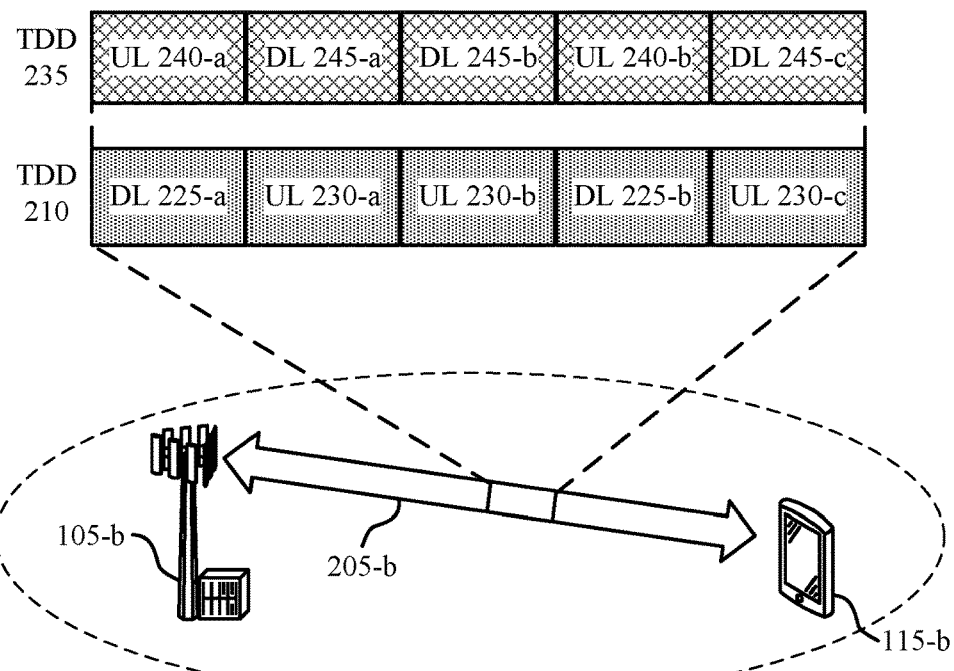

FIGS. 2A and 2B illustrate examples of wireless communications systems 200 and 201 that support monitoring for an uplink PI in accordance with aspects of the present disclosure. In some examples, wireless communications systems 200 and 201 may implement aspects of wireless communications system 100. For example, wireless communications system 200 may include a UE 115-a and a serving cell 105-a, which may be examples of a UE 115 and a cell or base station 105, respectively, as described above with reference to FIG. 1. In some cases, UE 115-a may communicate according to eMBB services, such that if URLLC traffic is present within the system, resources utilized for the eMBB communications may be suspended to accommodate the URLLC traffic and reduce interference imposed on the URLLC traffic. Beneficially, suspending eMBB communications on shared resources may enable efficient operation of a transceiver of the UE 115-a by reducing the processing requirements necessary for demodulating and decoding signals associated with eMBB communications in the presence of interference.

Additionally, UE 115-a may be configured to operate in CA and communicate with serving cell 105-a on multiple CCs of a carrier 205-a. For example, UE 115-a may communicate with serving cell 105-a on a first CC according to a TDD 210 configuration that includes one or more downlink (DL) portions 225 and one or more uplink (UL) portions 230. However, as described above, if URLLC traffic is present and serving cell 105-a attempts to transmit an uplink PI to UE 115-a while UE 115-a is within an uplink portion 230, UE 115-a may be unable to monitor for or receive the uplink PI.

In one implementation, UE 115-a may be additionally configured to communicate with serving cell 105-a on a second CC of carrier 205-a according to an FDD 215 configuration. Accordingly, FDD 215 may include multiple downlink portions 220 across a time span for the communications, such that one or more of the downlink portions 220 may coincide with uplink portions 230 of TDD 210. For example, when UE 115-a is in uplink portions 230-a and 230-b of TDD 210 for the first CC, it may also be in downlink portions 220-a and 220-d, respectively, of FDD 215 for the second CC. As such, UE 115-a may monitor for downlink information (e.g., PI) on corresponding downlink portions 220 of FDD 215 while transmitting uplink information to serving cell 105-a in uplink portions 230 of TDD 210. For example, UE 115-a may monitor downlink portion 220-a of FDD 215 on the second CC while transmitting during an uplink portion 230-a of TDD 210 on the first CC and may receive an uplink PI from the serving cell while transmitting in the uplink portion 230-a. UE 115-a may then preempt resources (e.g., suspend communications) in uplink portion 230-a or a subsequent uplink portion 230 for an indicated upcoming transmission.

Based on using this pairing between TDD 210 and FDD 215 (e.g., TDD-FDD pairing), serving cell 105-a may send an uplink PI without having to wait for a downlink portion 225 (e.g., slot) of TDD 210, improving system performance. For example, the TDD-FDD pairing may allow an uplink PI to be sent on an FDD cell (e.g., the second CC with FDD 215) and applied to a paired TDD cell (e.g., the first CC with TDD 210).

Additionally or alternatively, wireless communications system 201 may include a UE 115-b and a serving cell 105-b, which may be examples of a UE 115 and a cell or base station 105, respectively, as described above with reference to FIGS. 1 and 2A. Additionally, UE 115-b and serving cell 105-b may be the same devices as UE 115-a and serving cell 105-a as described above with reference to FIG. 2A. Accordingly, UE 115-b may communicate according to eMBB services, such that if URLLC traffic is present within the system, resources utilized for the eMBB communications may be suspended to accommodate the URLLC traffic and reduce interference imposed on the URLLC traffic. Additionally, UE 115-b may communicate with serving cell 105-b on multiple CCs of a CA operation for a carrier 205-b, where the communications include a first CC using a TDD 210 configuration similar to the TDD 210 described above with reference to FIG. 2A. For example, TDD 210 may include one or more downlink (DL) portions 225 and one or more uplink (UL) portions 230. However, as described above, if URLLC traffic is present and serving cell 105-b attempts to transmit an uplink PI to UE 115-b while UE 115-b is within an uplink portion 230, UE 115-b may be unable to monitor for or receive the uplink PI.

In another implementation different from the implementation discussed in FIG. 2A, UE 115-b may be additionally configured to communicate with serving cell 105-b on a second CC of carrier 205-b according to a complementary TDD 235 configuration. For example, complementary TDD 235 may include one or more uplink portions 240 and one or more downlink portions 245, where uplink portions 240 and downlink portions 245 are opposite of downlink portions 225 and uplink portions 230 of TDD 210. As such, UE 115-b may monitor the complementary TDD 235 in a downlink portion 245 while transmitting during an uplink portion 230. In some cases, UE 115-b may receive an uplink PI from serving cell 105-b while transmitting in an uplink portion 230, where the uplink PI may alter the uplink transmission schedule of the UE 115-b (e.g., suspend transmissions, preempt resources, etc.).

In some cases, UE 115-b may be configured with the second CC with complementary TDD 235 and an additional CC (e.g., third CC) with an FDD configuration as described above with reference to FIG. 2A. By being configured with both a CC with complementary TDD 235 and a CC with the FDD configuration, the likelihood that the uplink PI is received by UE 115-b may be increased because more downlink monitoring opportunities may be provided to UE 115-b.

UEs 115-a and 115-b may determine to monitor for the uplink PI in downlink portions of FDD 215 and/or complementary TDD 235 based on received signaling from serving cells 105-a and 105-b. For example, the signaling may indicate specific cells the UEs 115 are to monitor for the uplink PI. Additionally or alternatively, the signaling may indicate whether the UE 115 is to monitor an FDD cell or TDD cell, and the UE 115 may determine the locations of the downlink portions of either cell corresponding to uplink portions of a first TDD cell based on the duplexing indication.

In some cases, the uplink portions and the downlink portions may consist of a time span allocated for the corresponding transmission directions. Alternatively, in some cases, the portions may be allocated in smaller increments for different transmission directions. For example, downlink portion 225-b may be allocated with sub-portions for downlink transmissions, a guard period, and uplink transmissions. As such, UE 115-a and 115-b may monitor the sub-portions allocated for the downlink transmissions for the uplink PI, preempt resources of the sub-portions allocated for the uplink transmissions, or a combination thereof.

Additionally, uplink timings (i.e., K1 and K2) may be indicated to UE 115-*a* or UE 115-*b* semi-statically (e.g., via RRC signaling) or dynamically (e.g., via downlink control information (DCI)) for uplink portions 230 of TDD 210. The K1 and K2 values may be in units of slots and indicate a gap between receiving a downlink channel and transmitting uplink information. For example, K1 may indicate a gap between receiving a physical downlink control channel (PDCCH) and transmitting a HARQ acknowledgement (ACK) message, and K2 may indicate a gap between receiving an uplink grant and transmitting a physical uplink shared channel (PUSCH). For low latency applications (e.g., URLLC), large K1 and K2 values may not be needed, and the uplink timing may instead be indicated in units of symbols. Users that are able to close the uplink loop when indicated in a number of symbols (e.g., fast users able to turn around information quickly) may or may not be configured to follow a new timing. The indication may be dynamic or RRC (e.g., semi-static) based. For example, a dynamic indication may be explicit or implicit (e.g., as a function of the number of RBs, number of CCs, number of layers, number of symbols for control, the location of demodulation reference signals (DMRS), etc.). These users may not be required to monitor PI since their uplink timing is in the order of the PI indication (e.g., based on symbol timings instead of slot timings). For example, serving cell 105-*a* or 105-*b* may schedule eMBB and URLLC traffic such that neither overlap and/or refrain from scheduling eMBB traffic because scheduling decisions may occur at the same time at serving cell 105-*a* or 105-*b* based on both following a fast timeline (e.g., based on the symbol timings). Whether UE 115-*a* or 115-*b* is required to monitor PI may, for example, be decided on a per CC basis.

In some cases, UE 115-*a* or 115-*b* (e.g., an eMBB UE 115) may determine to refrain from monitoring for an uplink PI at a symbol m (e.g., over an FDD 215 cell or a downlink portion of a complementary TDD 235 cell) if collision is not expected with a URLLC uplink transmission (e.g., URLLC PUSCH) that starts at symbol m+N2. For example, there may be downlink symbols or no scheduled eMBB uplink transmission (e.g., eMBB PUSCH) or no scheduled URLLC (i.e., eMBB anchor slots) to cause a collision. As such, an uplink PI processing time may follow that of the URLLC N2 uplink transmission or may be different. Additionally or alternatively, an eMBB PUSCH timeline may be equal to or larger than the PI timeline. If the two timelines are the same, serving cell 105-*a* or 105-*b* (e.g., a base station 105) may avoid collisions by scheduling the two timelines accordingly. If the eMBB PUSCH timeline is larger, then at symbol m, UE 115-*a* or 115-*b* may determine whether an eMBB PUSCH at a symbol m+N2 is possible without interfering with a URLLC PUSCH. Beneficially, by refraining from monitoring for uplink PIs at certain symbols, a transceiver of the UE 115-*a* or 115-*b* may reduce the processing requirements necessary for demodulating and decoding signals associated with the uplink PIs.

Additionally, eMBB may include anchor slots. For example, the anchor slots may indicate a number of slots that are kept for eMBB communications without interruption from other communications (e.g., URLLC traffic). These slots may be indicated as anchor slots for the eMBB communication, and no URLLC traffic may be expected in these slots. As such, the UE may not be expected to monitor the uplink PI applicable to these slots.

In some cases, UE 115-*a* or 115-*b* may be at cell edges of serving cells 105-*a* and 105-*b*, respectively. As such, UE 115-*a* or 115-*b* may not be required to monitor an uplink PI channel based on their cell edge location. In general, cell-edge eMBB UEs 115 may not impose large interference at a serving cell 105. Accordingly, the decision to monitor the uplink PI channel may be made based on setting a path-loss threshold or a calculation of an uplink transmission power by the UE 115. For example, if a path-loss is above a threshold, the UE 115 may determine uplink transmissions received at the serving cell 105 from the UE 115 may have minimal impact on URLLC traffic at the serving cell 105 and refrain from monitoring the uplink PI channel. Additionally or alternatively, if an estimated receive power at the serving cell 105 based on the calculated uplink transmission power is below a threshold, the UE 115 may refrain from monitoring the uplink PI channel because the estimated receive power may be small enough to have little impact on URLLC traffic at the serving cell 105.

In some cases, the uplink PI may be a multicast message (e.g., sent to a group of UEs 115). For example, the multicast message may be applicable per timing advance (TA) group (e.g., users same distance from the serving cell) or per transmit power control (TPC) group. Downlink and uplink PIs may be indicated via a same DCI or separate DCIs. For example, a downlink PI may be transmitted after URLLC traffic is received to indicate to the user to ignore previously received downlink information. In some cases, the uplink PI payload may be reduced as compared to the downlink PI DCI. This may, for example, allow the uplink PI to be decoded as soon as possible. For example, different configurations may be considered to reduce the number of bits for the payload (e.g., groupings of two (2), four (4), or seven (7) symbols in a two-slot uplink PI). Additionally or alternatively, the coding may be based on Reed-Muller (RM) coding rather than polar coding to reduce the complexity of transmitting and receiving the uplink PI.

In some cases, the uplink PI may be defined to perform various actions. For example, the uplink PI may be defined to indicate for a user to do nothing, stop transmission, or lower power. If the PI indicates the user to lower its power, a UE backoff (e.g., amount of power to lower) may be indicated by RRC signaling. To further reduce the payload of the uplink PI, the uplink PI may indicate a command to stop the transmission, where the transmission is stopped in different slots. For example, for a 2-bit payload, the uplink PI may indicate for the user to do nothing (e.g., '00' payload), stop an eMBB transmission in a current slot (e.g., '01' payload), or stop an eMBB transmission in a next slot (e.g., '10' payload).

As described herein, one or more FDD cell and/or one or more complementary TDD cells (e.g., complementary uplink/downlink patterns) may be paired with a first TDD cell on a first CC, where each uplink portion on the first TDD cell may overlap with a downlink portion on the one or more FDD cells and/or the one or more complementary TDD cells. As such, an uplink PI may be transmitted on one or more FDD cells and/or one or more complementary TDD cells to indicate preempted resources on an uplink portion of the first TDD cell when a URLLC transmission is identified. Additionally or alternatively, as described above, UE 115-*a* or 115-*b* may refrain from monitoring for the uplink PI despite being in an uplink portion of the first TDD cell based on identified uplink timings, identified non-collisions, being a cell edge UE 115, or a combination thereof.

Figure 3:
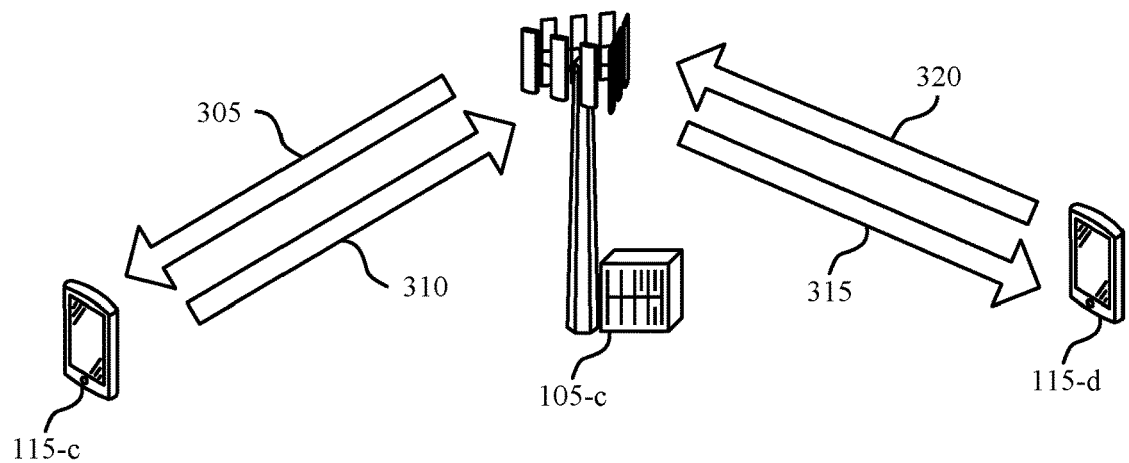
FIG. 3 illustrates an example of a resource preemption that supports monitoring for an uplink PI in accordance with aspects of the present disclosure.
Figure 3:
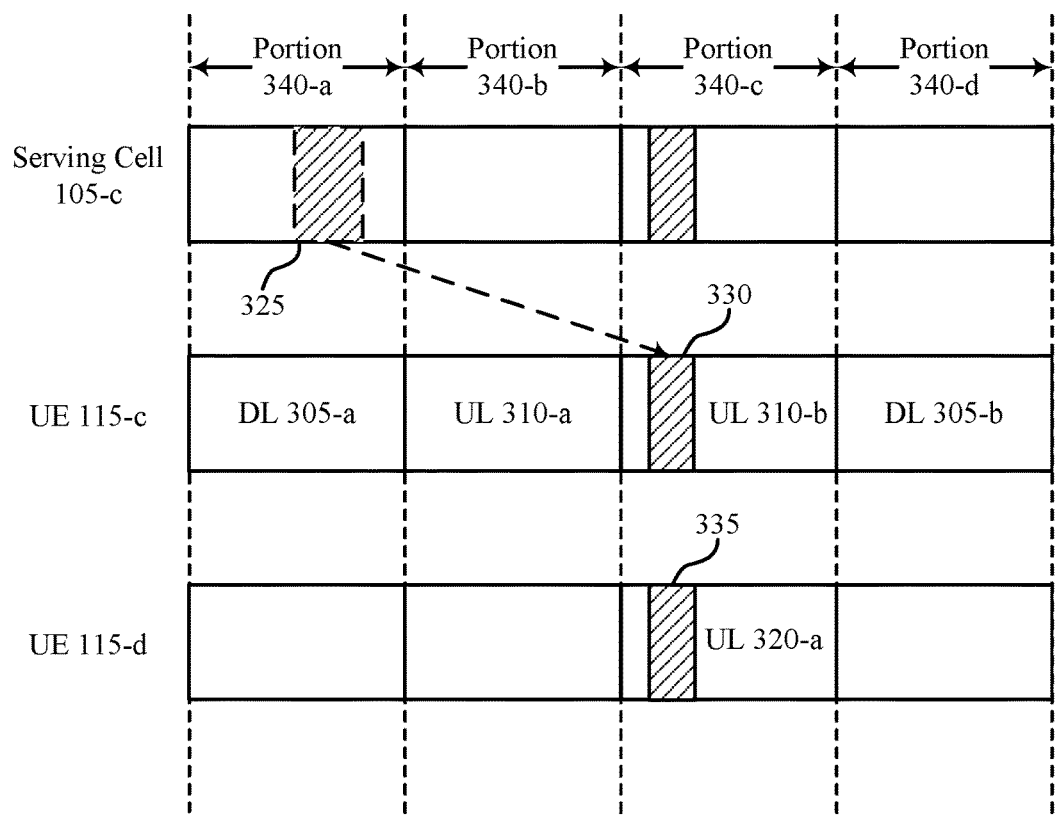

FIG. 3 illustrates an example of a resource preemption 300 that supports monitoring for an uplink PI in accordance with aspects of the present disclosure. In some examples, resource preemption 300 may implement aspects of wireless communications systems 100, 200, and/or 201. Resource preemption 300 may include a serving cell 105-c, a UE 115-c, and a UE 115-d, which may be examples of a serving cell 105 (e.g., base station 105) and UEs 115, respectively, as described above with reference to FIGS. 1, 2A, and 2B. In some cases, UE 115-c may be an example of an eMBB user and communicate with serving cell 105-cover downlink transmissions 305 and uplink transmissions 310. Additionally, downlink transmissions 305 and uplink transmissions 310 may be communicated on one or more CCs as part of a CA operation for one carrier. In some cases, UE 115-d may be an example of a URLLC user and communicate with serving cell 105-c over downlink transmissions 315 and uplink transmissions 320.

Additionally, UE 115-c may be configured to communicate on a first CC according to a TDD configuration, where the TDD configuration includes one or more portions 340 allocated to downlink transmissions 305 and one or more portions allocated to uplink transmissions 310. As such, UE 115-c may determine to refrain from monitoring downlink transmissions 305 (e.g., downlink channel) during the uplink transmissions 310-a and 310-b of portions 340-b and 340-c (e.g., uplink slots or symbols) based on one direction being supported at a given time for TDD. However, in some cases, URLLC uplink traffic 335 may occur during portion 340-c, where UE 115-c is currently sending uplink transmissions 310-b. Therefore, UE 115-c may not be able to monitor for or receive an uplink PI that preempts the uplink transmissions 310-b.

In some cases, serving cell 105-c may wait for a portion 340 allocated for downlink transmissions 305 to send an uplink PI 325 and schedule URLLC uplink traffic 335. However, the next occurring portion 340 (e.g., portion 340-d) may occur after URLLC uplink traffic 335, which may compromise the strict latency requirements associated with URLLC. If the uplink PI is sent on portions 340 allocated for downlink transmissions 305 for a TDD cell, fast URLLC scheduling, while reducing eMBB interference, may not be possible. For example, two (2) back-to-back slots (e.g., portions 340-b and 340-c) may be configured for uplink transmissions 310-a and 310-b, respectively. To be able to preempt any resources for URLLC uplink traffic 335 occurring in portion 340-c, serving cell 105-c may transmit an uplink PI 325 in portion 340-a allocated for downlink transmissions 305-a for the TDD cell of UE 115-c before the portions 34-b and 34-c allocated for uplink transmissions 310-a and 310-b. However, due to the unpredictability associated with URLLC traffic (e.g., URLLC is often bursty, and it is unknown when it will occur), serving cell 105-c may be unable to plan for or transmit the uplink PI 325 that far in advance (e.g., in portion 340-a).

As described herein, methods that allow serving cell 105-c to send an uplink PI without having to wait for a downlink slot may improve system performance. For example, TDD-FDD pairing may allow an uplink PI to be sent on an FDD cell and applied to a paired TDD cell. In another example, multiple TDD cells may be paired with complementary uplink/downlink patterns, where each uplink portion on one TDD cell may overlap with the downlink portion on another TDD cell and vice versa. As such, a PI may be transmitted on a downlink portion for one TDD cell to indicate preempted resources on an uplink portion of another TDD cell when a URLLC transmission is identified.

To enable monitoring for an uplink PI in order to identify preempted resources 330 corresponding to URLLC uplink traffic 335, UE 115-c may have different PI monitoring configurations for different portions 340 of the TDD configuration. For example, UE 115-c may monitor for the uplink PI (e.g., a PI channel) over the downlink transmissions 305 in corresponding portions 340 (e.g., portions 340-a and 340-d). Additionally, UE 115-c may monitor downlink portions of an FDD cell (e.g., based on a TDD-FDD pairing) and/or additional downlink portions of additional TDD cells during the downlink transmissions 305 to increase the likelihood of receiving the uplink PI. During uplink transmissions 310 in corresponding portions 340, UE 115-c may also monitor for the PI on the downlink portions of the associated FDD cell or a downlink portion of a complementary TDD cell (e.g., based on multiple TDD cells paired with complementary uplink/downlink patterns). In this case, the number of blind decodes (BDs) over the monitored downlink portions of the given TDD cell may be higher than over the uplink portions of the FDD cell or downlink portions of the complementary TDD cell. In another example, UE 115-c may monitor the additional cell (e.g., FDD cell or complementary TDD cell) for the uplink PI over the uplink portions of the given TDD cell, and over the downlink portions of the given cell, UE 115-c may monitor for the uplink PI on the given TDD cell and not the FDD cell or additional TDD cells. This scheme may, for example, balance the amount of BDs over the downlink and uplink portions and across the cells (e.g., given TDD cell, FDD cell, complementary TDD cell, etc.).

Figure 4:
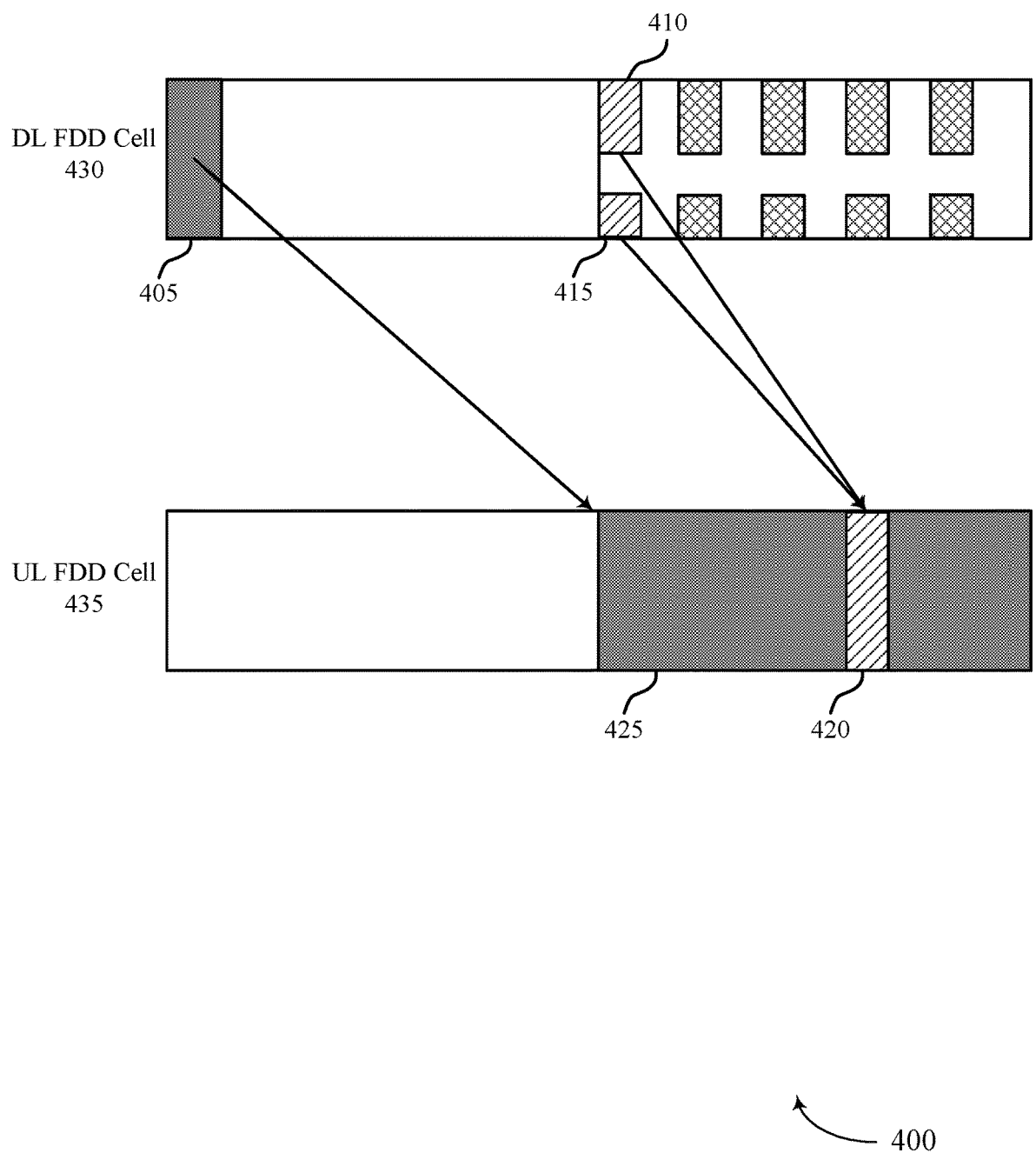
FIG. 4 illustrates an example of a PI transmission that supports monitoring for an uplink PI in accordance with aspects of the present disclosure.

FIG. 4 illustrates an example of a PI transmission 400 that supports monitoring for an uplink PI in accordance with aspects of the present disclosure. In some examples, PI transmission 400 may implement aspects of wireless communications systems 100, 200, and 201. PI transmission 400 may indicate transmitting an uplink PI to from a serving cell 105 to a UE 115, where the UE 115 is configured with a CA operation for multiple CCs. As shown, the CCs may be configured with FDD such that a downlink FDD cell 430 and an uplink FDD cell 435 occur simultaneously. Additionally, the UE 115 may be an eMBB user such that if any higher priority traffic (e.g., URLLC traffic) is present, resource allocated for eMBB communications may be preempted by the higher priority traffic.

In some cases, the UE 115 may receive a PDCCH 405 in downlink FDD cell 430 that indicates for the UE 115 to transmit uplink information in an eMBB PUSCH 425 on uplink FDD cell 435. However, the serving cell 105 may identify upcoming high priority traffic 420 (e.g., URLLC traffic or low latency traffic) is to be transmitted from the UE 115 to the serving cell 105. For example, the serving cell 105 may request high priority traffic 420 from the UE 115, or the UE 115 may identify high priority traffic 420 and transmit it once identified without receiving a request from the serving cell 105. Based on high priority traffic 420, some resources allocated for eMBB PUSCH 425 may be reclaimed (e.g., preempted) for high priority traffic 420. For example, eMBB PUSCH 425 may be suspended in order to reduce the interference imposed on high priority traffic 420.

Accordingly, a number of scheduling occasions 410 may be configured to identify and signal an indication for high priority traffic 420. In some cases, scheduling occasions 410 may be shorter than other scheduling occasions utilized for eMBB communications (e.g., mini-slots spanning one or more symbols). The serving cell 105 may utilize scheduling occasion 410 to transmit an uplink PI 415 from downlink FDD cell 430 to uplink FDD cell 435 to indicate upcoming high priority traffic 420. For example, uplink PI 415 may reclaim resources of the uplink FDD cell 435. As such, for FDD cells, the serving cell 105 may transmit the uplink PI 415 in a downlink portion occurring simultaneously to an uplink portion as soon as high priority traffic 420 is identified. Therefore, preempting uplink resources may be more challenging (e.g., increased latency) in TDD cells than FDD cells.

As described herein, if the UE 115 is configured to communicate on a CC according to a TDD configuration, an additional FDD cell and/or complementary TDD cell may be configured for the UE 115. As such, the UE 115 may monitor downlink portions of the FDD cell and/or complementary TDD cell for the uplink PI 415 while in an uplink portion of the TDD configuration to reduce latency and increase reliability for receiving the uplink PI 415 and accommodating for the associated high priority traffic 420. In some cases, the UE 115 may receive signaling from the serving cell 105 to indicate whether to monitor for the uplink PI 415 on the FDD cell and/or complementary TDD cell. Additionally or alternatively, the UE 115 may determine to refrain from monitoring for the uplink PI 415 based on uplink timings, identifying a collision will not occur with high priority traffic 420, being a cell edge UE, or a combination thereof, as described above with reference to FIGS. 2A and 2B.

Figure 5:
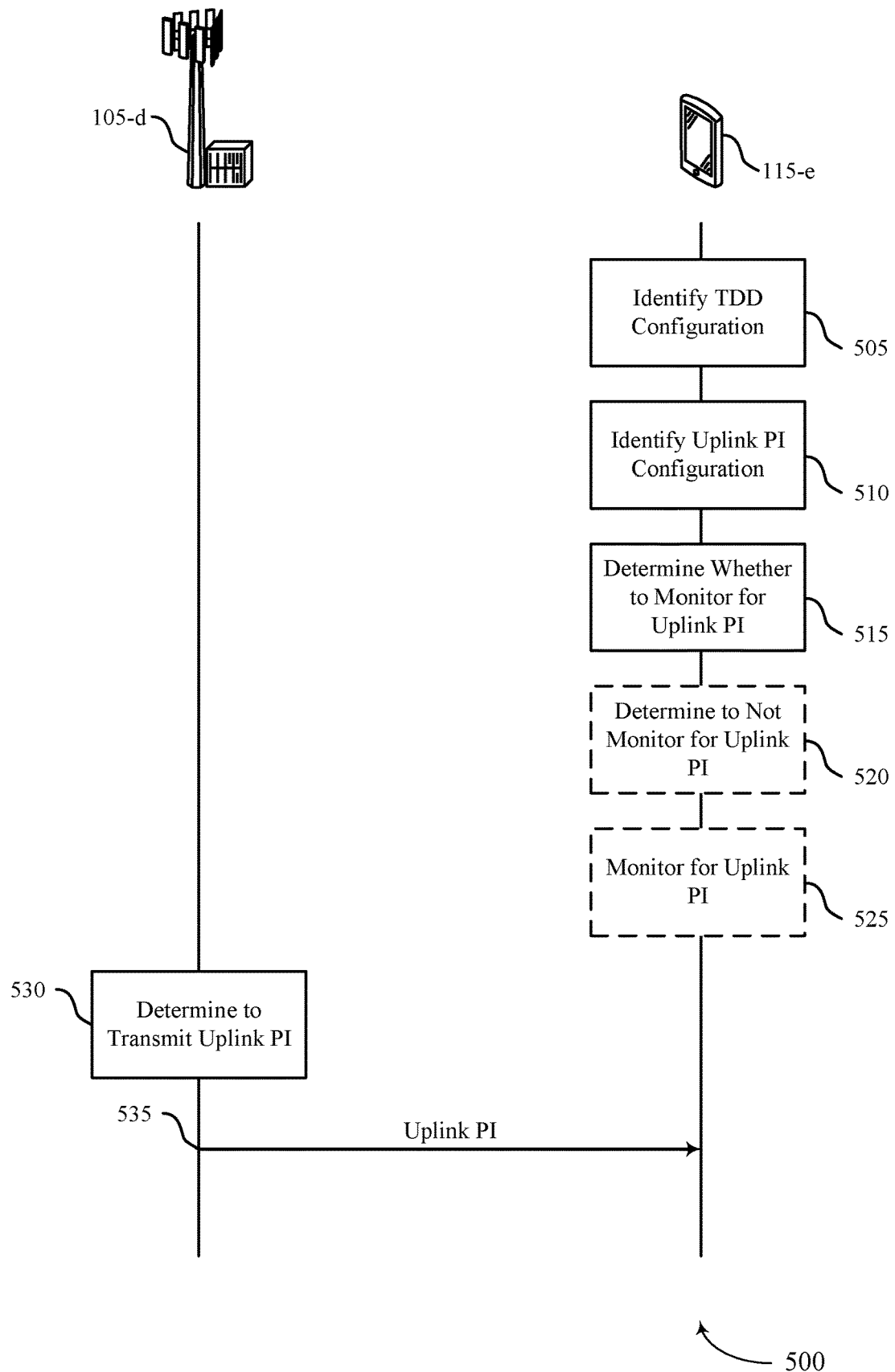
FIG. 5 illustrates an example of a process flow that supports monitoring for an uplink PI in accordance with aspects of the present disclosure.

FIG. 5 illustrates an example of a process flow 500 that supports monitoring for an uplink PI in accordance with aspects of the present disclosure. In some examples, process flow 500 may implement aspects of wireless communications systems 100, 200, and/or 201. Process flow 500 may include a serving cell 105-d and a UE 115-e, which may be examples of corresponding devices as described above with reference to FIGS. 1-4. In some cases, UE 115-e may operate according to eMBB services. As such, if URLLC traffic is present in the system, eMBB traffic to or from UE 115-e may be preempted to accommodate the URLLC traffic. As described herein, a PI may be transmitted to UE 115-e to indicate upcoming URLLC traffic.

In the following description of the process flow 500, the operations between UE 115-e and serving cell 105-d may be performed in different orders or at different times. Certain operations may also be left out of the process flow 500, or other operations may be added to the process flow 500. It is to be understood that while UE 115-e and serving cell 105-d are shown performing a number of the operations of process flow 500, any wireless device may perform the operations shown.

At 505, UE 115-e may identify that it is in communication with serving cell 105-d via a first CC in accordance with a TDD configuration that includes one or more downlink portions and one or more uplink portions.

At 510, UE 115-e may identify that it is configured to receive uplink PIs via a second CC (e.g., so that the uplink PIs may be received via the second CC while the UE is operating in at least one uplink portion of the one or more uplink portions of the TDD configuration identified for the first CC), where the uplink PIs indicate that uplink traffic on the first CC is to be preempted.

At 515, UE 115-e may determine whether to monitor the second component carrier for uplink PIs during the one or more uplink portions.

At 520, UE 115-e may determine to refrain from monitoring for uplink PIs during the one or more uplink portions. For example, UE 115-e may identify that at least some uplink timing parameters are indicated to the UE in terms of symbols and determine to refrain from monitoring for uplink PIs based on the at least some uplink timing parameters being in terms of symbols and being within a threshold amount of an uplink preemption indication timing. In some cases, UE 115-e may receive an explicit indication of the at least some uplink timing parameters via either RRC signaling or DCI signaling. Additionally or alternatively, UE 115-e may identify the uplink parameters based on a number of associated resource blocks, a number of associated CCs, a number of associated layers, a number of associated control symbols, a location of a demodulation reference signal, or combinations thereof. Additionally, UE 115-e may determine to refrain from monitoring for uplink PI on a per CC basis.

Additionally or alternatively, UE 115-e may identify that a collision between an uplink transmission of itself during the one or more uplink portions and a preempting uplink transmission of another UE during the same one or more uplink portions is not expected and determine to refrain from monitoring for uplink PIs based on an expectation that no collisions will occur during the one or more uplink portions. For example, UE 115-e may identify that a collision is not expected based on a timeline for communications by the other UE precludes uplink transmissions during the one or more uplink portions, UE 115-e is not scheduled to transmit an uplink transmission during the one or more uplink portions, the one or more uplink portions are anchor slots for lower priority traffic, such that higher priority traffic is not allowed to preempt lower priority traffic during the anchor slots, or a combination thereof.

Additionally or alternatively, UE 115-e may identify that it is near a cell edge of serving cell 105-d and determine to refrain from monitoring for uplink PIs based on it being near the cell edge of serving cell 105-d. In some cases, UE 115-e may determine to refrain from monitoring for uplink PIs based on whether communications between it and serving cell 105-d satisfy a path-loss threshold, or whether an estimate of an uplink receive power of uplink transmissions by UE 115-e to the serving cell satisfy an uplink receive power threshold.

At 525, UE 115-e may determine to monitor for uplink PIs based on a received indication from serving cell 105-d. In some cases, UE 115-e may monitor for uplink PIs transmitted via the second CC in accordance with an FDD configuration, such that the uplink PIs are received via the second CC during the one or more uplink portions of the TDD configuration. Additionally or alternatively, UE 115-e may monitor, during at least one uplink portion of the one or more uplink portions of the TDD configuration one or more uplink portions of the TDD configuration identified for the first CC), which is a first TDD configuration, for uplink PIs transmitted via the second CC in accordance with a second TDD configuration (e.g., complementary TDD configuration) that includes downlink portions during the one or more uplink portions of the first TDD configuration, where the monitoring is of the downlink portions of the second TDD configuration.

In some cases, UE 115-e may monitor for uplink PIs via both the first CC and the second CC during the one or more downlink portions of the TDD configuration and monitor for uplink PIs via the second CC during the one or more uplink portions. Additionally or alternatively, UE 115-e may monitor for uplink PIs via the first CC during the one or more downlink portions of the TDD configuration, refrain from monitoring for uplink PIs via the second CC during the one or more downlink portions of the TDD configuration, and monitor for uplink preemption indications via the second CC during the one or more uplink portions.

At 530, serving cell 105-*d* may identify that it is to transmit an uplink PI via a CC, where the uplink PI indicates that uplink traffic to it is to preempt transmission of uplink traffic from UE 115-*e*. In some cases, the uplink PIs may be coded via Reed-Muller coding.

At 535, serving cell 105-*d* may transmit, to UE 115-*e*, the uplink PI such that UE 115-*e* operating in accordance with the TDD configuration that includes one or more downlink portions and one or more uplink portions is able to monitor for the uplink PI during the one or more uplink portions of the TDD configuration. In some cases, UE 115-*e* may identify whether to ignore the uplink PI, refrain from transmitting an uplink transmission based on receiving the uplink PI, or reduce an uplink transmission power based on receiving the uplink PI. Additionally, UE 115-*e* may receive, via RRC signaling, an indication of an amount by which the uplink transmission power is to be reduced. The uplink PI may further indicate in which slot the UE is to refrain from transmitting an uplink transmission.

In some cases, the uplink PIs may be received as part of a multicast message, where the multicast message is associated with either a TA group or a TPC group. Additionally, the uplink PIs may be indicated via a same DCI message that is used to indicate downlink PIs. Alternatively, the uplink PIs may be indicated via a first DCI message that is different from a second DCI message used to indicate downlink PIs. In some cases, the uplink PIs may include a smaller payload than downlink PIs.

Figure 6:
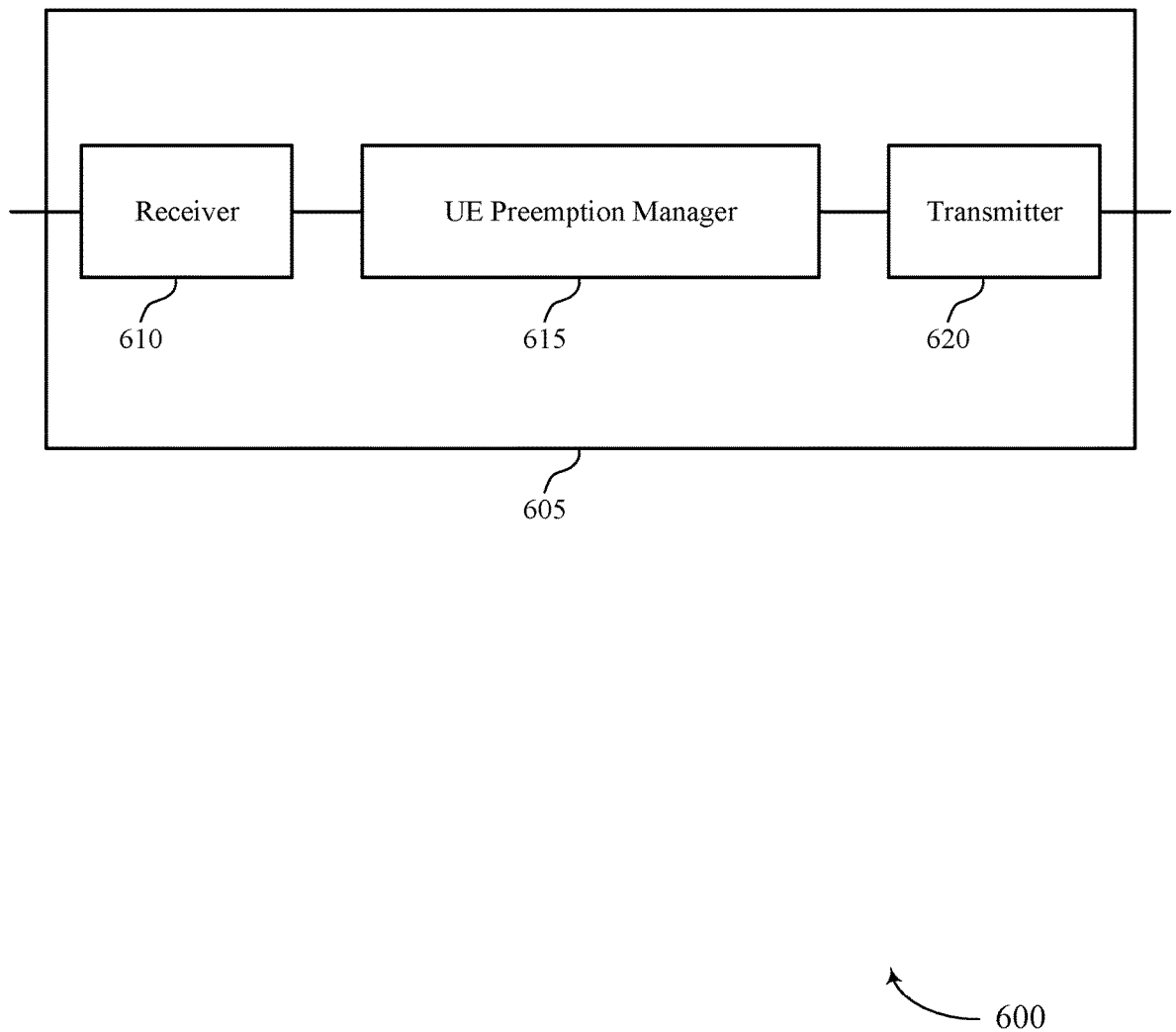
FIGS. 6 and 7 show block diagrams of devices that support monitoring for an uplink PI in accordance with aspects of the present disclosure.

FIG. 6 shows a block diagram 600 of a device 605 that supports monitoring for an uplink PI in accordance with aspects of the present disclosure. The device 605 may be an example of aspects of a UE 115 as described herein. The device 605 may include a receiver 610, a UE preemption manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to monitoring for an uplink PI, etc.). Information may be passed on to other components of the device 605. The receiver 610 may be an example of aspects of the transceiver 920 described with reference to FIG. 9. The receiver 610 may utilize a single antenna or a set of antennas.

The UE preemption manager 615 may identify that the UE is in communication with a serving cell via a first CC in accordance with a TDD configuration that includes one or more downlink portions and one or more uplink portions. Additionally, the UE preemption manager 615 may identify that the UE is configured to receive uplink PIs via a second CC (e.g., so that the uplink PIs may be received via the second CC while the UE is operating in at least one uplink portion of the one or more uplink portions of the TDD configuration identified for the first CC), where the uplink PIs indicate that uplink traffic on the first CC is to be preempted. In some cases, the UE preemption manager 615 may determine whether to monitor the second component carrier for uplink PIs during the one or more uplink portions. The UE preemption manager 615 may be an example of aspects of the UE preemption manager 910 described herein.

The UE preemption manager 615, or its sub-components, may be implemented in hardware, code (e.g., software or firmware) executed by a processor, or any combination thereof. If implemented in code executed by a processor, the functions of the UE preemption manager 615, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE preemption manager 615, or its sub-components, may be physically located at various positions, including being distributed such that portions of functions are implemented at different physical locations by one or more physical components. In some examples, the UE preemption manager 615, or its sub-components, may be a separate and distinct component in accordance with various aspects of the present disclosure. In some examples, the UE preemption manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
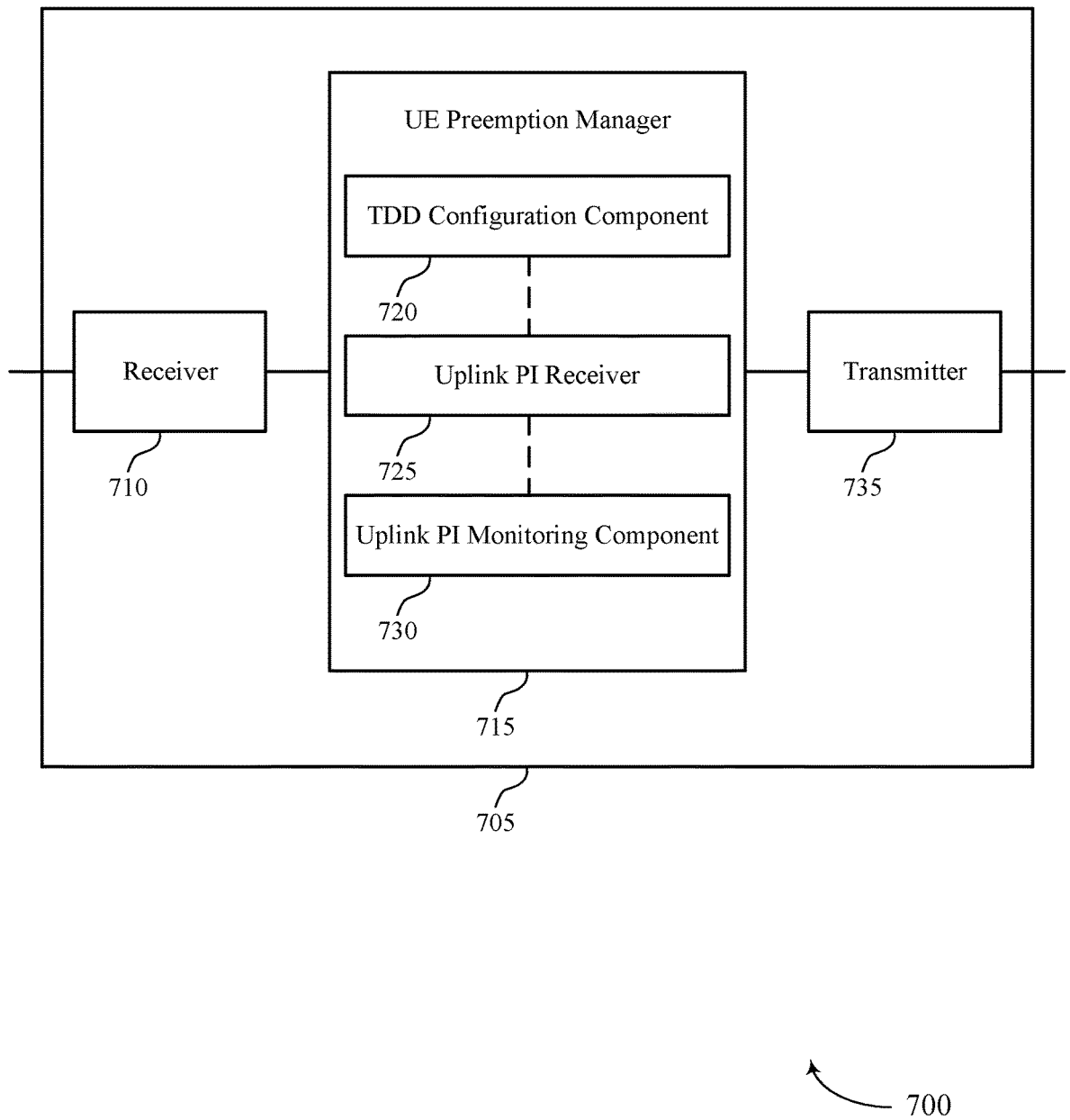

FIG. 7 shows a block diagram 700 of a device 705 that supports monitoring for an uplink PI in accordance with aspects of the present disclosure. The device 705 may be an example of aspects of a device 605 or a UE 115 as described herein. The device 705 may include a receiver 710, a UE preemption manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to monitoring for an uplink PI, etc.). Information may be passed on to other components of the device 705. The receiver 710 may be an example of aspects of the transceiver 920 described with reference to FIG. 9. The receiver 710 may utilize a single antenna or a set of antennas.

The UE preemption manager 715 may be an example of aspects of the UE preemption manager 615 as described herein. The UE preemption manager 715 may include a TDD configuration component 720, an uplink PI receiver 725, and an uplink PI monitoring component 730. The UE preemption manager 715 may be an example of aspects of the UE preemption manager 910 described herein.

The TDD configuration component 720 may identify that the UE is in communication with a serving cell via a first CC in accordance with a TDD configuration that includes one or more downlink portions and one or more uplink portions.

The uplink PI receiver 725 may identify that the UE is configured to receive uplink PIs via a second CC (e.g., so that the uplink PIs may be received via the second CC while the UE is operating in at least one uplink portion of the one or more uplink portions of the TDD configuration identified for the first CC), where the uplink PIs indicate that uplink traffic on the first CC is to be preempted.

The uplink PI monitoring component 730 may determine whether to monitor the second component carrier for uplink PIs pertaining to the one or more uplink portions on the first CC.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
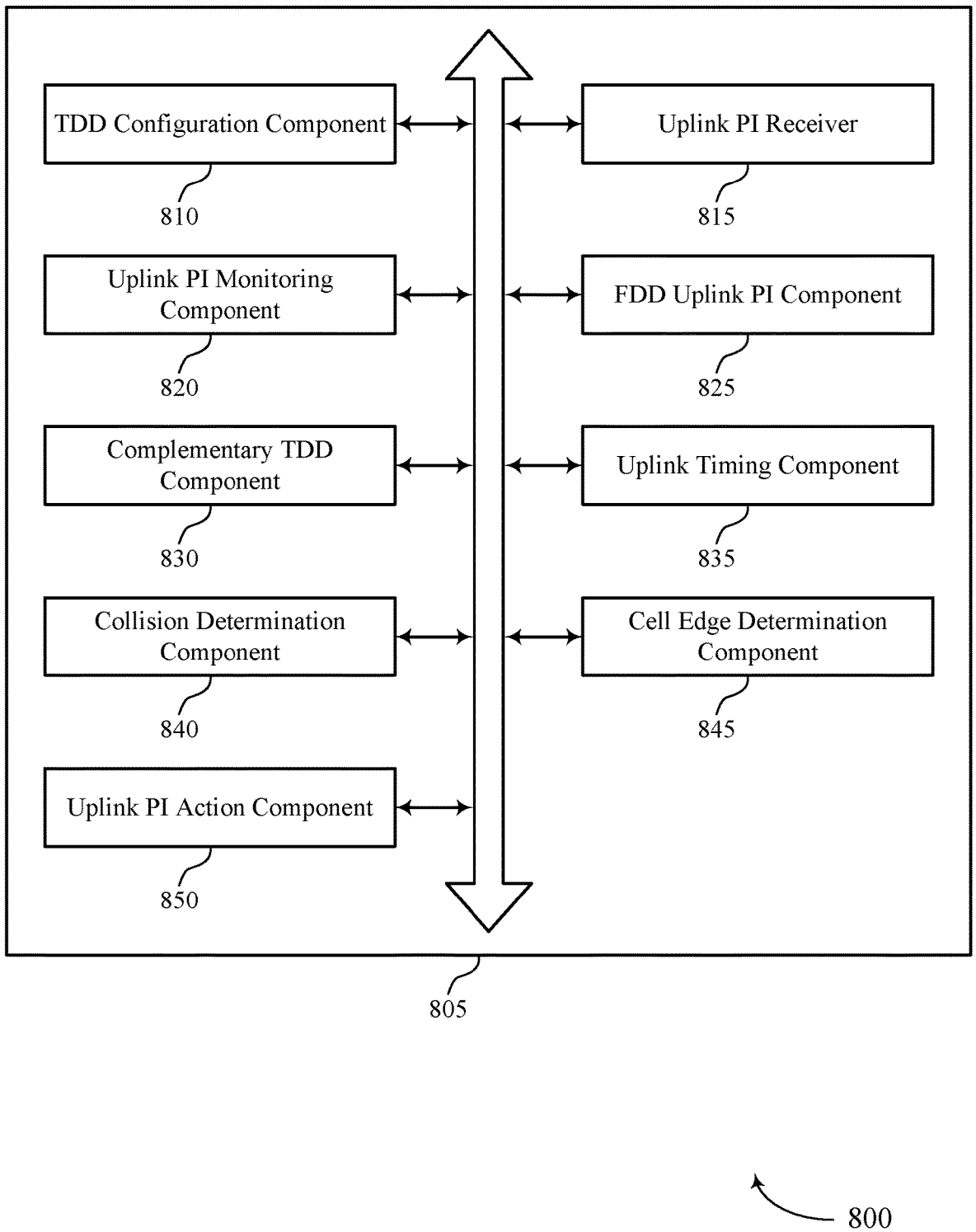
FIG. 8 shows a block diagram of a UE preemption manager that supports monitoring for an uplink PI in accordance with aspects of the present disclosure.

FIG. 8 shows a block diagram 800 of a UE preemption manager 805 that supports monitoring for an uplink PI in accordance with aspects of the present disclosure. The UE preemption manager 805 may be an example of aspects of a UE preemption manager 615, a UE preemption manager 715, or a UE preemption manager 910 described herein. The UE preemption manager 805 may include a TDD configuration component 810, an uplink PI receiver 815, an uplink PI monitoring component 820, an FDD uplink PI component 825, a complementary TDD component 830, an uplink timing component 835, a collision determination component 840, a cell edge determination component 845, and an uplink PI action component 850. Each of these modules may communicate, directly or indirectly, with one another (e.g., via one or more buses).

The TDD configuration component 810 may identify that the UE is in communication with a serving cell via a first CC in accordance with a TDD configuration that includes one or more downlink portions and one or more uplink portions.

The uplink PI receiver 815 may identify that the UE is configured to receive uplink PIs via a second CC (e.g., so that the uplink PIs may be received via the second CC while the UE is operating in at least one uplink portion of the one or more uplink portions of the TDD configuration identified for the first CC), where the uplink PIs indicate that uplink traffic on the first CC is to be preempted. In some examples, the uplink PI receiver 815 may determine to monitor for uplink PIs based on a received indication. In some cases, the uplink PIs may be received as part of a multicast message. For example, the multicast message may be associated with either a TA group or a TPC group.

In some cases, the uplink PIs may be indicated via a same DCI message that is used to indicate downlink PIs. Alternatively, the uplink PIs may be indicated via a first DCI message that is different from a second DCI message used to indicate downlink PIs. Additionally, the uplink PIs may include a smaller payload than downlink PIs. In some cases, the uplink PIs may be coded via Reed-Muller coding.

The uplink PI monitoring component 820 may determine whether to monitor the second component carrier for uplink PIs pertaining to the one or more uplink portions on the first CC. In some examples, the uplink PI monitoring component 820 may monitor for uplink PIs via both the first CC and the second CC during the one or more downlink portions of the TDD configuration. Additionally, the uplink PI monitoring component 820 may monitor for uplink PIs via the second CC during the one or more uplink portions. In some cases, the uplink PI monitoring component 820 may monitor for uplink PIs via the first CC during the one or more downlink portions of the TDD configuration and refrain from monitoring for uplink PIs via the second CC during the one or more downlink portions of the TDD configuration.

The FDD uplink PI component 825 may monitor for uplink PIs transmitted via the second CC in accordance with an FDD configuration, such that the uplink PIs are received via the second CC during the one or more uplink portions of the TDD configuration.

The complementary TDD component 830 may monitor, during at least one uplink portion of the one or more uplink portions of the TDD configuration one or more uplink portions of the TDD configuration identified for the first CC), which is a first TDD configuration, for uplink PIs transmitted via the second CC in accordance with a second TDD configuration that includes downlink portions during the one or more uplink portions of the first TDD configuration, where the monitoring is of the downlink portions of the second TDD configuration.

The uplink timing component 835 may identify that at least some uplink timing parameters are indicated to the UE in terms of symbols. In some examples, the uplink timing component 835 may determine to refrain from monitoring for uplink PIs based on the at least some uplink timing parameters being in terms of symbols and being within a threshold amount of an uplink PI timing. In some cases, the uplink timing component 835 may determine to refrain from monitoring for uplink PI on a per CC basis. Additionally, the uplink timing component 835 may identify the at least some uplink timing parameters based on a number of associated resource blocks, a number of associated CCs, a number of associated layers, a number of associated control symbols, a location of a demodulation reference signal, or combinations thereof. In some cases, the uplink timing component 835 may receive an explicit indication of the at least some uplink timing parameters via either RRC signaling or DCI signaling.

The collision determination component 840 may identify that a collision between an uplink transmission of the UE during the one or more uplink portions and a preempting uplink transmission of another UE during the same one or more uplink portions is not expected. In some examples, the collision determination component 840 may determine to refrain from monitoring for uplink PIs based on an expectation that no collisions will occur during the one or more uplink portions.

Additionally or alternatively, the collision determination component 840 may identify that a timeline for communications by the other UE precludes uplink transmissions during the one or more uplink portions. Accordingly, the collision determination component 840 may identify that the UE is not scheduled to transmit an uplink transmission during the one or more uplink portions. In some examples, the collision determination component 840 may identify that the one or more uplink portions are anchor slots for lower priority traffic, such that higher priority traffic is not allowed to preempt lower priority traffic during the anchor slots.

The cell edge determination component 845 may identify that the UE is near a cell edge of the serving cell. In some examples, the cell edge determination component 845 may determine to refrain from monitoring for uplink PIs based on the UE being near the cell edge of the serving cell. Additionally or alternatively, the cell edge determination component 845 may determine whether communications between the UE and the serving cell satisfy a path-loss threshold, or whether an estimate of an uplink receive power of uplink transmissions by the UE to the serving cell satisfy an uplink receive power threshold.

The uplink PI action component 850 may receive an uplink PI if the UE determines to monitor for uplink PIs during the one or more uplink portions. Additionally, the uplink PI action component 850 may identify whether to ignore the uplink PI, refrain from transmitting an uplink transmission based on receiving the uplink PI, or reduce an uplink transmission power based on receiving the uplink PI. In some examples, the uplink PI action component 850 may receive, via RRC signaling, an indication of an amount by which the uplink transmission power is to be reduced. In some cases, the uplink PI may further indicate in which slot the UE is to refrain from transmitting an uplink transmission.

Figure 9:
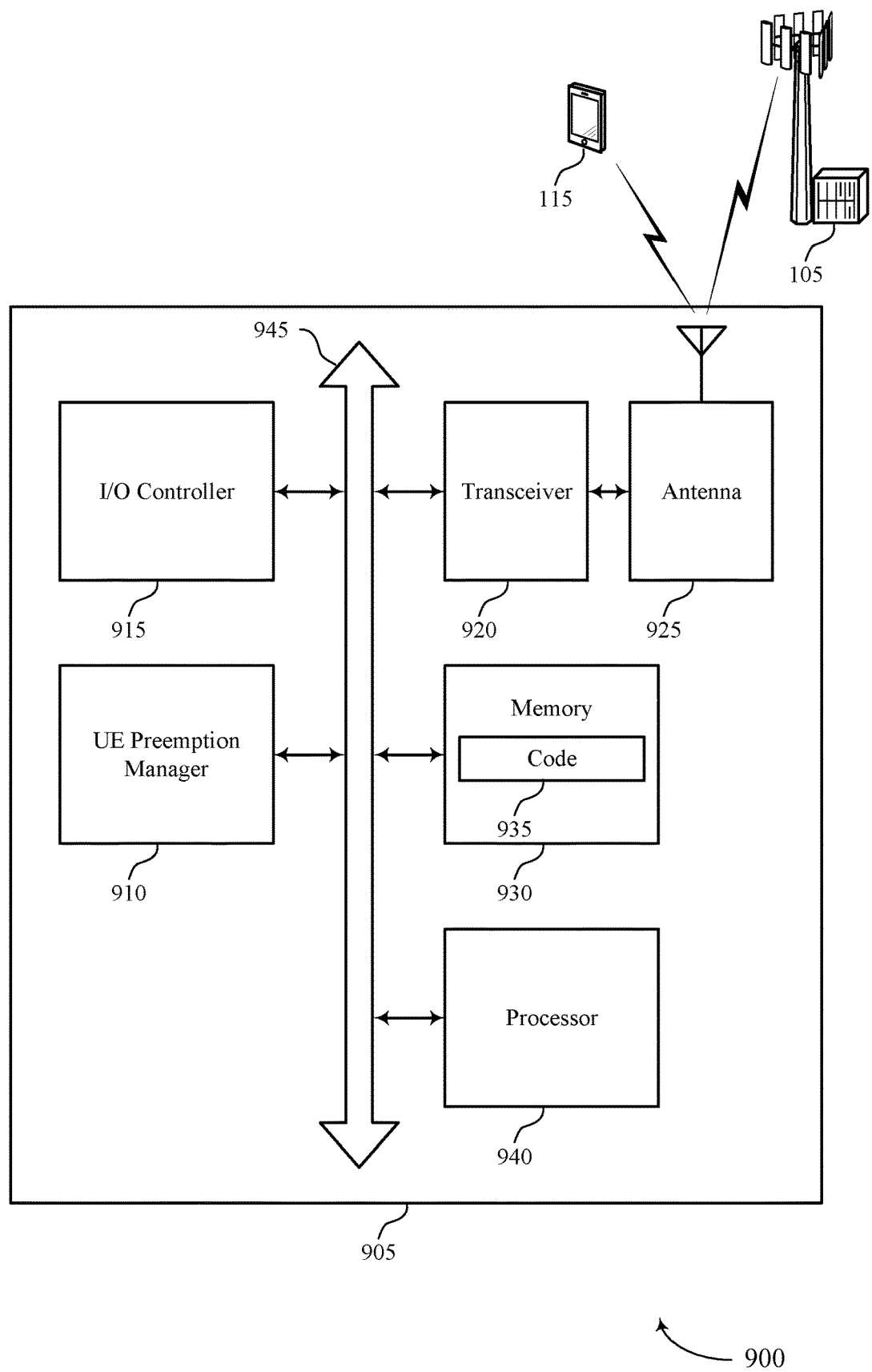
FIG. 9 shows a diagram of a system including a device that supports monitoring for an uplink PI in accordance with aspects of the present disclosure.

FIG. 9 shows a diagram of a system 900 including a device 905 that supports monitoring for an uplink PI in accordance with aspects of the present disclosure. The device 905 may be an example of or include the components of device 605, device 705, or a UE 115 as described herein. The device 905 may include components for bi-directional voice and data communications including components for transmitting and receiving communications, including a UE preemption manager 910, an I/O controller 915, a transceiver 920, an antenna 925, memory 930, and a processor 940. These components may be in electronic communication via one or more buses (e.g., bus 945).

The UE preemption manager 910 may identify that the UE is in communication with a serving cell via a first CC in accordance with a TDD configuration that includes one or more downlink portions and one or more uplink portions. Additionally, the UE preemption manager 910 may identify that the UE is configured to receive uplink PIs via a second CC (e.g., so that the uplink PIs may be received via the second CC while the UE is operating in at least one uplink portion of the one or more uplink portions of the TDD configuration identified for the first CC), where the uplink PIs indicate that uplink traffic on the first CC is to be preempted. In some cases, the UE preemption manager 910 may determine whether to monitor the second component carrier for uplink PIs pertaining to the one or more uplink portions on the first CC.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting monitoring for an uplink PI).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
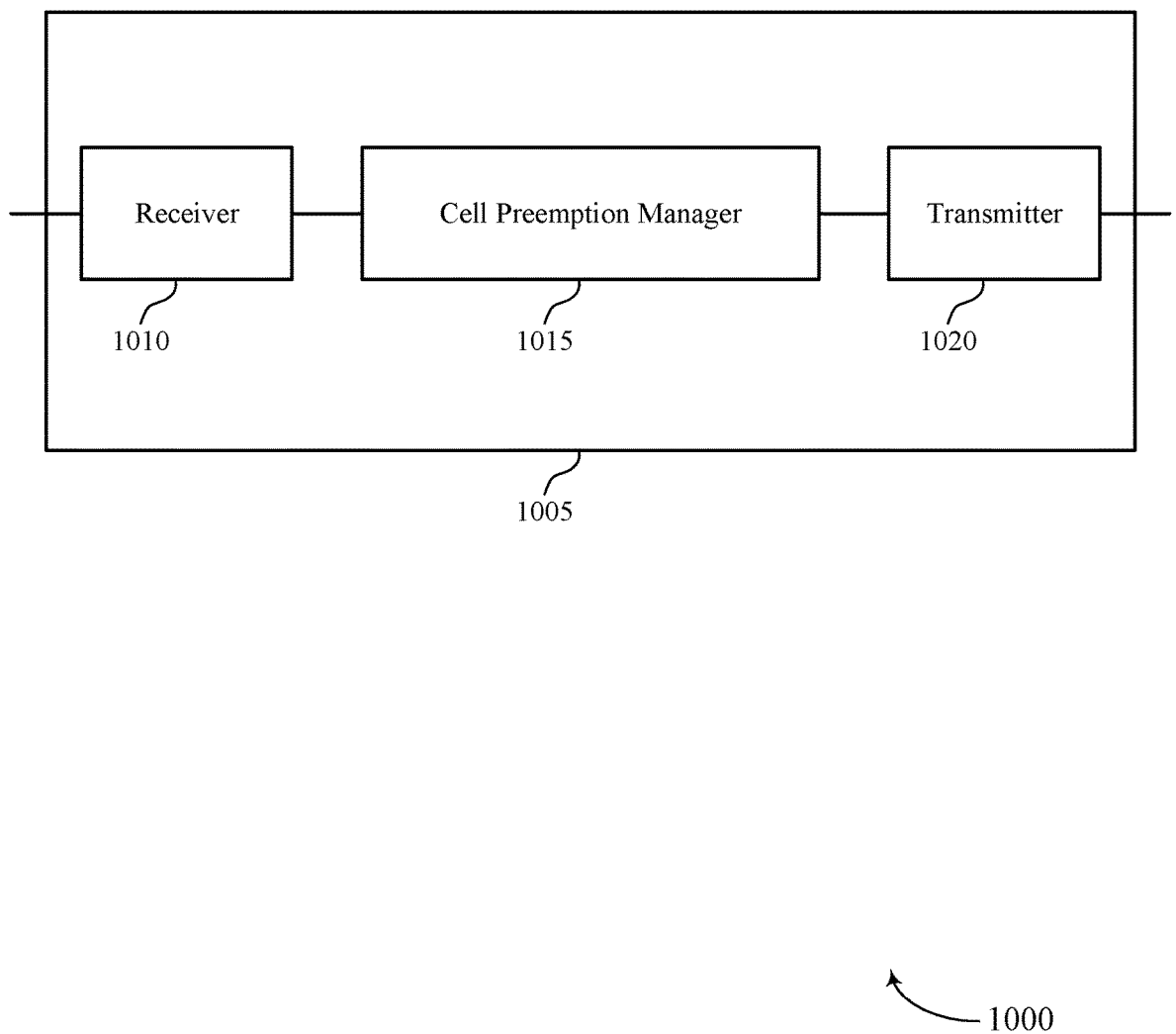
FIGS. 10 and 11 show block diagrams of devices that support monitoring for an uplink PI in accordance with aspects of the present disclosure.

FIG. 10 shows a block diagram 1000 of a device 1005 that supports monitoring for an uplink PI in accordance with aspects of the present disclosure. The device 1005 may be an example of aspects of a base station 105, serving cell 105, or similar cell 105 as described herein. The device 1005 may include a receiver 1010, a cell preemption manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to monitoring for an uplink PI, etc.). Information may be passed on to other components of the device 1005. The receiver 1010 may be an example of aspects of the transceiver 1320 described with reference to FIG. 13. The receiver 1010 may utilize a single antenna or a set of antennas.

The cell preemption manager 1015 may identify that the serving cell is to transmit an uplink PI via a CC, where the uplink PI indicates that uplink traffic to the serving cell is to preempt transmission of uplink traffic from a UE. Based on identifying the uplink preemption indicator, the cell preemption manager 1015 may then transmit the uplink PI such that the UE operating in accordance with a TDD configuration that includes one or more downlink portions and one or more uplink portions is able to monitor for the uplink PI during the one or more uplink portions of the TDD configuration. The cell preemption manager 1015 may be an example of aspects of the cell preemption manager 1310 described herein.

The cell preemption manager 1015, or its sub-components, may be implemented in hardware, code (e.g., software or firmware) executed by a processor, or any combination thereof. If implemented in code executed by a processor, the functions of the cell preemption manager 1015, or its sub-components may be executed by a general-purpose processor, a DSP, an ASIC, an FPGA or other PLD, discrete gate or transistor logic, discrete hardware components, or any combination thereof designed to perform the functions described in the present disclosure.

The cell preemption manager 1015, or its sub-components, may be physically located at various positions, including being distributed such that portions of functions are implemented at different physical locations by one or more physical components. In some examples, the cell preemption manager 1015, or its sub-components, may be a separate and distinct component in accordance with various aspects of the present disclosure. In some examples, the cell preemption manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
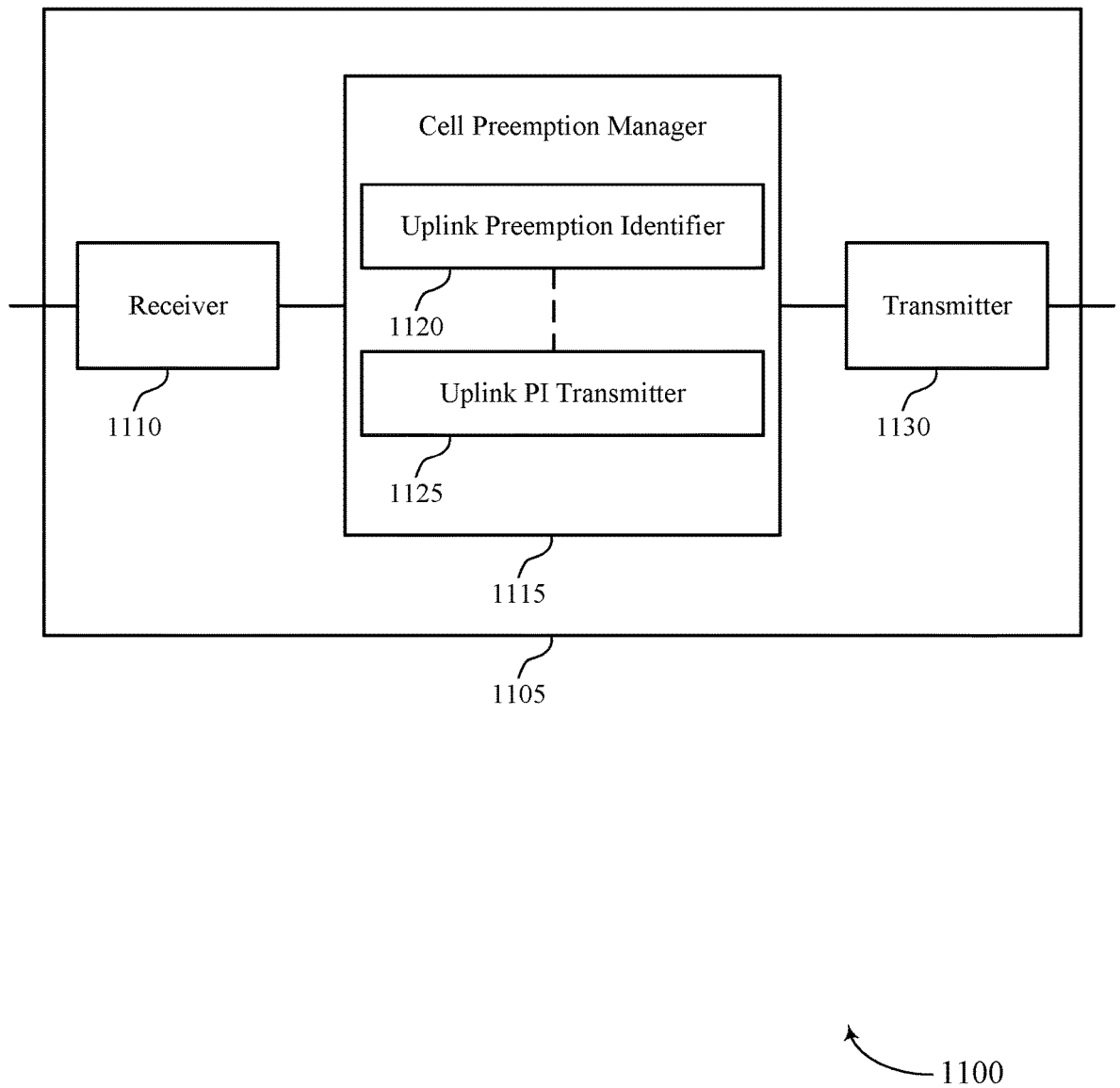

FIG. 11 shows a block diagram 1100 of a device 1105 that supports monitoring for an uplink PI in accordance with aspects of the present disclosure. The device 1105 may be an example of aspects of a device 1005, a base station 105, a serving cell 105, or a similar cell 105 as described herein. The device 1105 may include a receiver 1110, a cell preemption manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to monitoring for an uplink PI, etc.). Information may be passed on to other components of the device 1105. The receiver 1110 may be an example of aspects of the transceiver 1320 described with reference to FIG. 13. The receiver 1110 may utilize a single antenna or a set of antennas.

The cell preemption manager 1115 may be an example of aspects of the cell preemption manager 1015 as described herein. The cell preemption manager 1115 may include an uplink preemption identifier 1120 and an uplink PI transmitter 1125. The cell preemption manager 1115 may be an example of aspects of the cell preemption manager 1310 described herein.

The uplink preemption identifier 1120 may identify that the serving cell is to transmit an uplink PI via a CC, where the uplink PI indicates that uplink traffic to the serving cell is to preempt transmission of uplink traffic from a UE.

The uplink PI transmitter 1125 may transmit the uplink PI such that the UE operating in accordance with a TDD configuration that includes one or more downlink portions and one or more uplink portions is able to monitor for the uplink PI during the one or more uplink portions of the TDD configuration.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
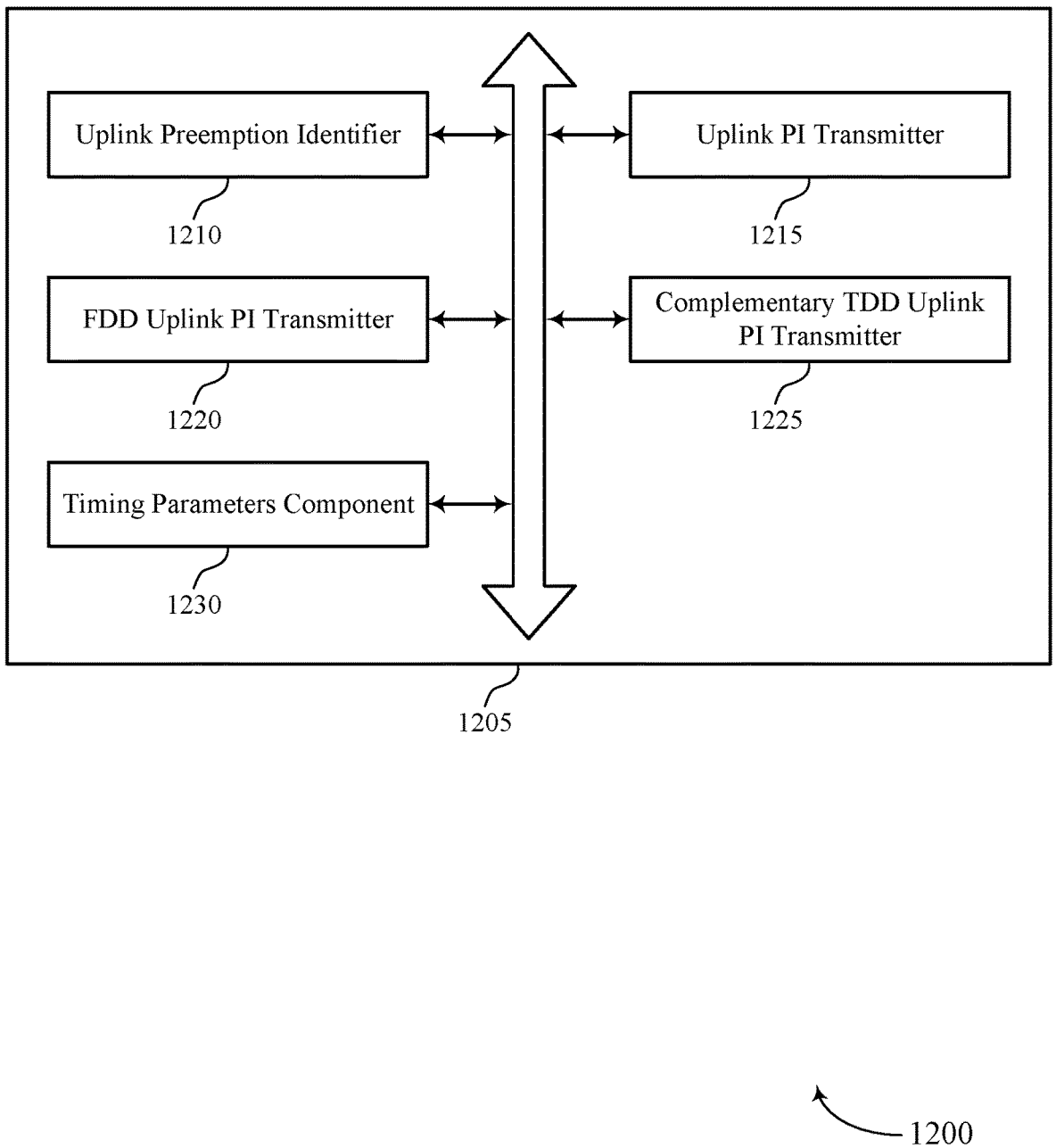
FIG. 12 shows a block diagram of a cell preemption manager that supports monitoring for an uplink PI in accordance with aspects of the present disclosure.

FIG. 12 shows a block diagram 1200 of a cell preemption manager 1205 that supports monitoring for an uplink PI in accordance with aspects of the present disclosure. The cell preemption manager 1205 may be an example of aspects of a cell preemption manager 1015, a cell preemption manager 1115, or a cell preemption manager 1310 described herein. The cell preemption manager 1205 may include an uplink preemption identifier 1210, an uplink PI transmitter 1215, an FDD uplink PI transmitter 1220, a complementary TDD uplink PI transmitter 1225, and a timing parameters component 1230. Each of these modules may communicate, directly or indirectly, with one another (e.g., via one or more buses).

The uplink preemption identifier 1210 may identify that the serving cell is to transmit an uplink PI via a CC, where the uplink PI indicates that uplink traffic to the serving cell is to preempt transmission of uplink traffic from a UE.

The uplink PI transmitter 1215 may transmit the uplink PI such that the UE operating in accordance with a TDD configuration that includes one or more downlink portions and one or more uplink portions is able to monitor for the uplink PI during the one or more uplink portions of the TDD configuration. In some examples, the uplink PI transmitter 1215 may transmit the uplink PI as part of a multicast message. In some cases, the multicast message may be associated with either a TA group or a TPC group.

Additionally, the uplink PI transmitter 1215 may transmit the uplink PI via a same DCI message that is used to indicate downlink PIs. Alternatively, the uplink PI transmitter 1215 may transmit the uplink PI via a DCI message that is different than that used to indicate downlink PIs. In some cases, the uplink PI may include a smaller payload than downlink PIs. Additionally, the uplink PI may be coded via Reed-Muller coding.

In some cases, the uplink PI may include an indication of whether the UE is to ignore the uplink PI, refrain from transmitting an uplink transmission based on receiving the uplink PI, or reduce an uplink transmission power based on receiving the uplink PI. Additionally, the uplink PI may further indicate in which slot the UE is to refrain from transmitting an uplink transmission.

The FDD uplink PI transmitter 1220 may transmit the uplink PI in accordance with an FDD configuration, such that the UE can monitor for the uplink PI during the one or more uplink portions of the TDD configuration.

The complementary TDD uplink PI transmitter 1225 may transmit the uplink PI on a downlink portion of a second TDD configuration, where the TDD configuration on which the UE is operating is a first TDD configuration, and where the downlink portion of the second TDD configuration overlaps with the one or more uplink portions of the first TDD configuration.

The timing parameters component 1230 may transmit at least some uplink timing parameters in terms of symbols via radio resource control signaling, where the at least some uplink timing parameters are within a threshold amount of an uplink PI timing.

Figure 13:
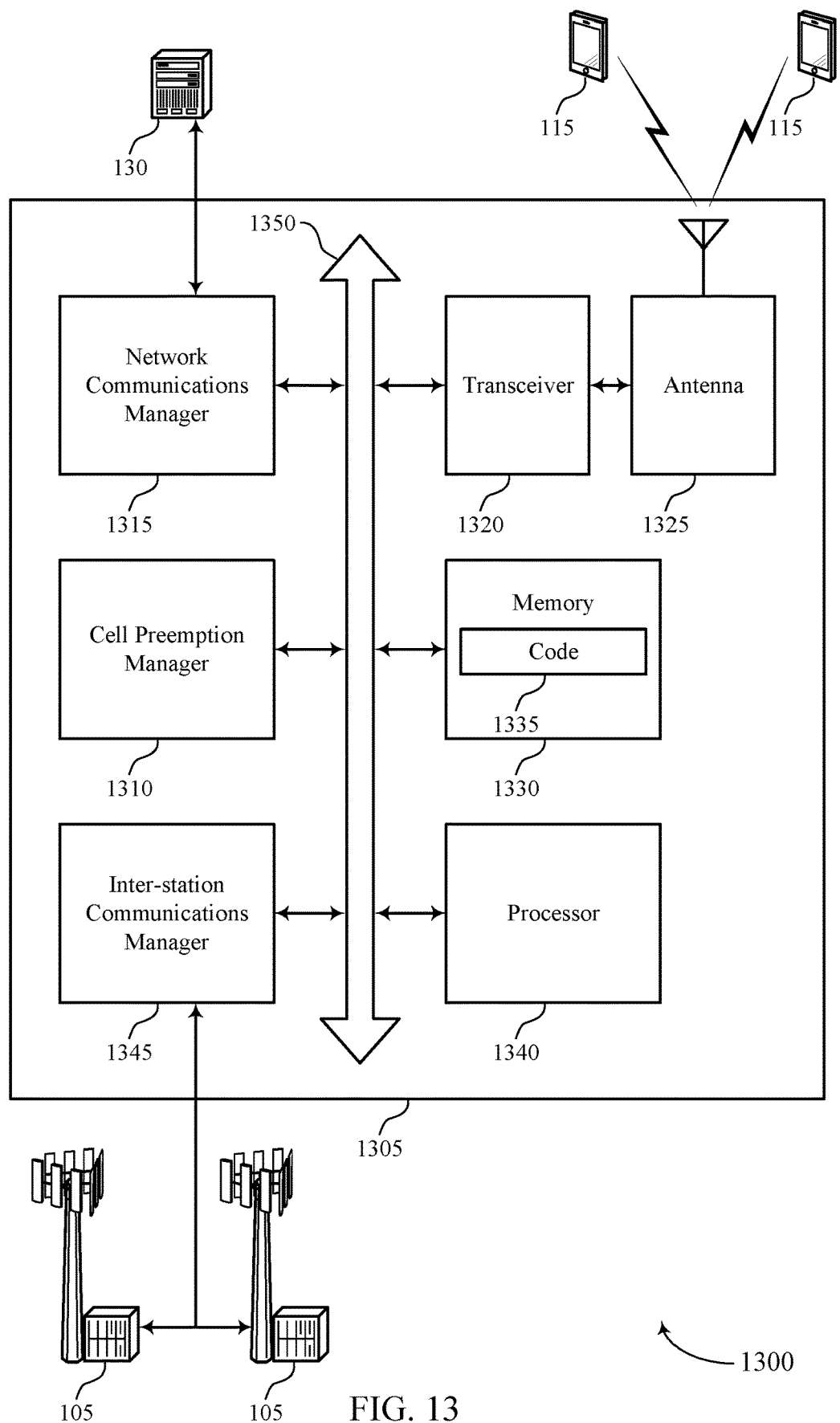
FIG. 13 shows a diagram of a system including a device that supports monitoring for an uplink PI in accordance with aspects of the present disclosure.

FIG. 13 shows a diagram of a system 1300 including a device 1305 that supports monitoring for an uplink PI in accordance with aspects of the present disclosure. The device 1305 may be an example of or include the components of device 1005, device 1105, a base station 105, a serving cell 105, or similar cell 105 as described herein. The device 1305 may include components for bi-directional voice and data communications including components for transmitting and receiving communications, including a cell preemption manager 1310, a network communications manager 1315, a transceiver 1320, an antenna 1325, memory 1330, a processor 1340, and an inter-station communications manager 1345. These components may be in electronic communication via one or more buses (e.g., bus 1350).

The cell preemption manager 1310 may identify that the serving cell is to transmit an uplink PI via a CC, where the uplink PI indicates that uplink traffic to the serving cell is to preempt transmission of uplink traffic from a UE. Based on identifying the uplink preemption indicator, the cell preemption manager 1310 may transmit the uplink PI such that the UE operating in accordance with a TDD configuration that includes one or more downlink portions and one or more uplink portions is able to monitor for the uplink PI during the one or more uplink portions of the TDD configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting monitoring for an uplink PI).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
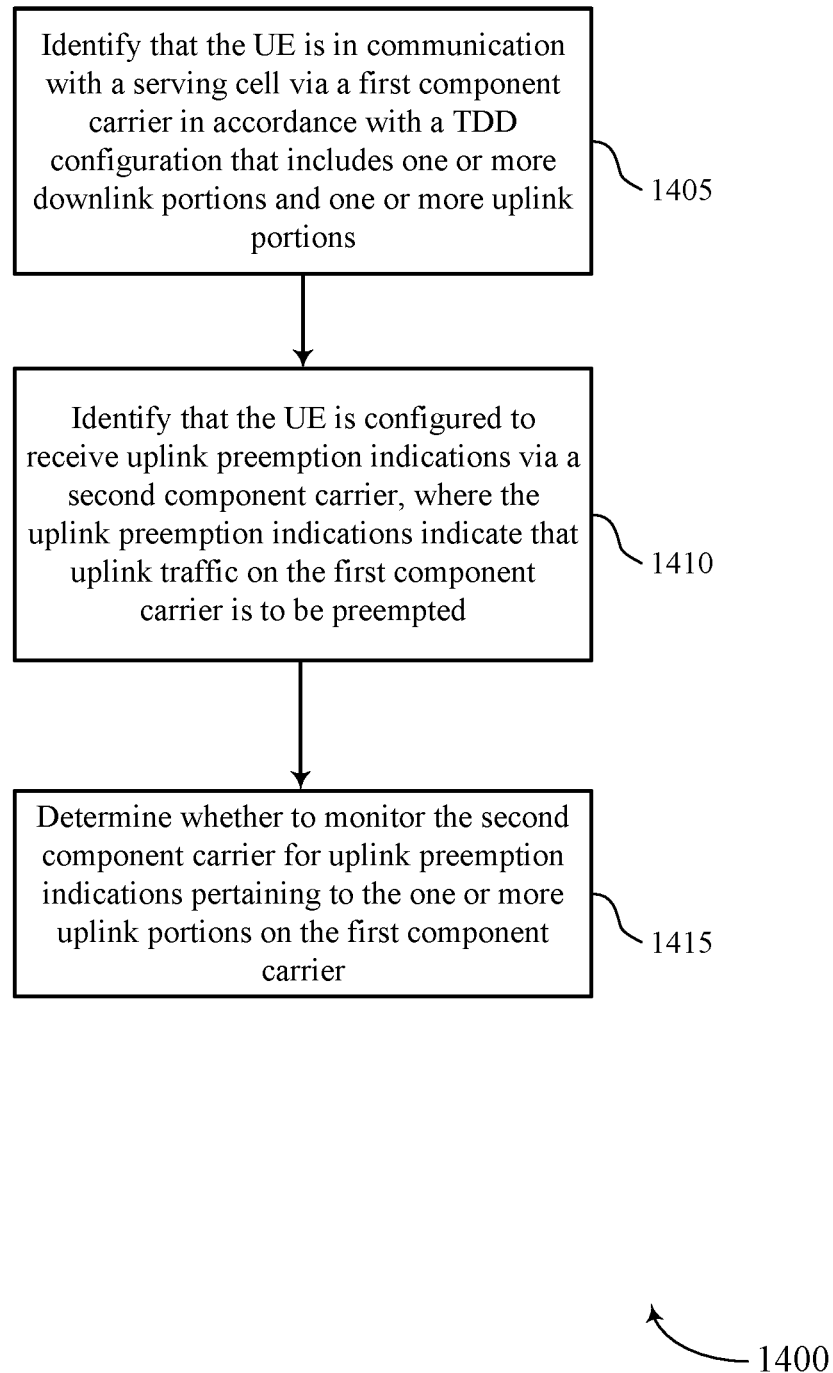
FIGS. 14 through 20 show flowcharts illustrating methods that support monitoring for an uplink PI in accordance with aspects of the present disclosure.

FIG. 14 shows a flowchart illustrating a method 1400 that supports monitoring for an uplink PI in accordance with aspects of the present disclosure. The operations of method 1400 may be implemented by a UE 115 or its components as described herein. For example, the operations of method 1400 may be performed by a UE preemption manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify that the UE is in communication with a serving cell via a first CC in accordance with a TDD configuration that includes one or more downlink portions and one or more uplink portions. The operations of 1405 may be performed according to the methods described herein. In some examples, aspects of the operations of 1405 may be performed by a TDD configuration component as described with reference to FIGS. 6 through 9.

At 1410, the UE may identify that the UE is configured to receive uplink PIs via a second CC (e.g., so that the uplink PIs may be received via the second CC while the UE is operating in at least one uplink portion of the one or more uplink portions of the TDD configuration identified for the first CC), where the uplink PIs indicate that uplink traffic on the first CC is to be preempted. The operations of 1410 may be performed according to the methods described herein. In some examples, aspects of the operations of 1410 may be performed by an uplink PI receiver as described with reference to FIGS. 6 through 9.

At 1415, the UE may determine whether to monitor the second component carrier for uplink PIs pertaining to the one or more uplink portions on the first CC. The operations of 1415 may be performed according to the methods described herein. In some examples, aspects of the operations of 1415 may be performed by an uplink PI monitoring component as described with reference to FIGS. 6 through 9.

Figure 15:
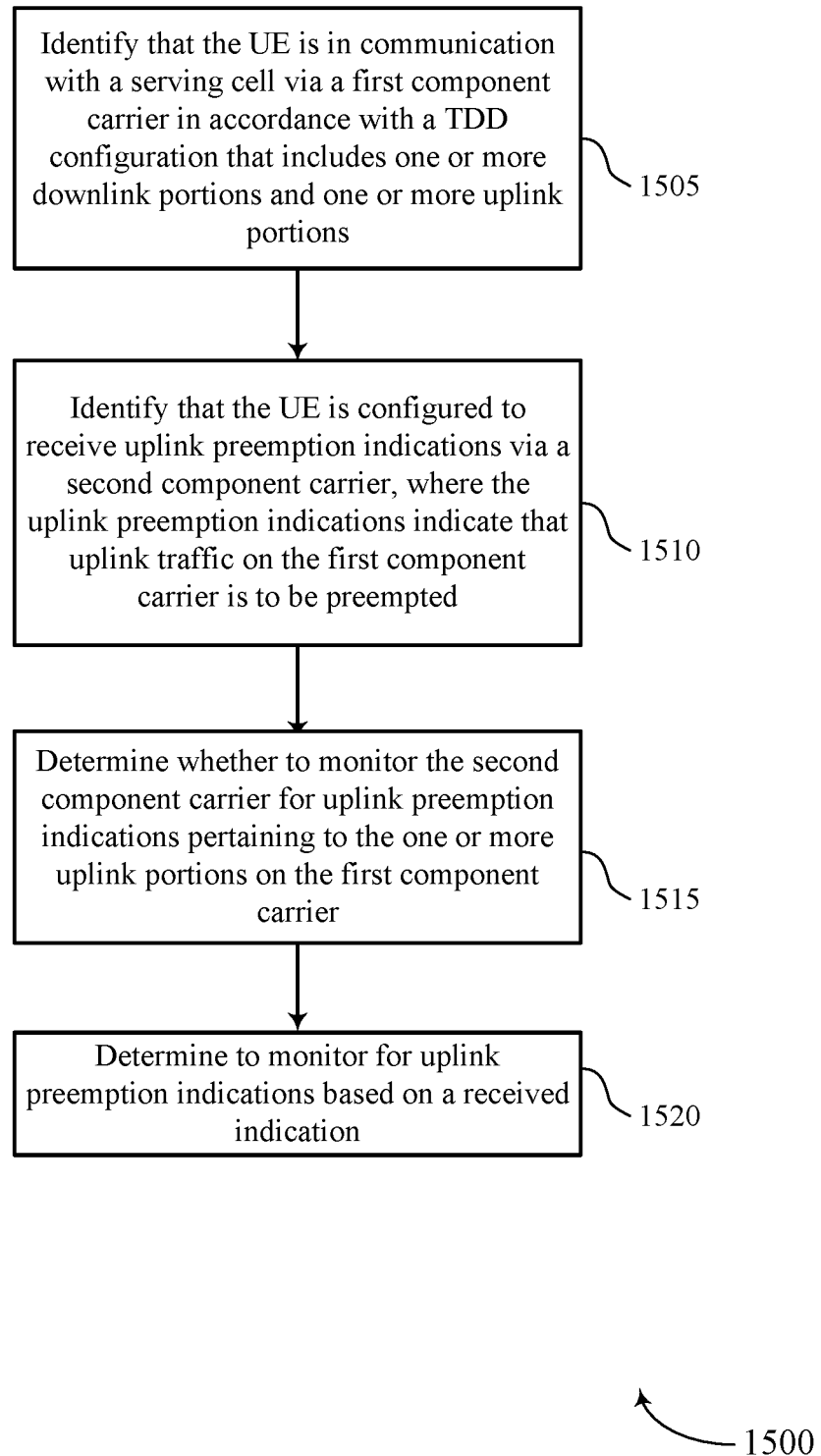

FIG. 15 shows a flowchart illustrating a method 1500 that supports monitoring for an uplink PI in accordance with aspects of the present disclosure. The operations of method 1500 may be implemented by a UE 115 or its components as described herein. For example, the operations of method 1500 may be performed by a UE preemption manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify that the UE is in communication with a serving cell via a first CC in accordance with a TDD configuration that includes one or more downlink portions and one or more uplink portions. The operations of 1505 may be performed according to the methods described herein. In some examples, aspects of the operations of 1505 may be performed by a TDD configuration component as described with reference to FIGS. 6 through 9.

At 1510, the UE may identify that the UE is configured to receive uplink PIs via a second CC (e.g., so that the uplink PIs may be received via the second CC while the UE is operating in at least one uplink portion of the one or more uplink portions of the TDD configuration identified for the first CC), where the uplink PIs indicate that uplink traffic on the first CC is to be preempted. The operations of 1510 may be performed according to the methods described herein. In some examples, aspects of the operations of 1510 may be performed by an uplink PI receiver as described with reference to FIGS. 6 through 9.

At 1515, the UE may determine whether to monitor the second component carrier for uplink PIs pertaining to the one or more uplink portions on the first CC. The operations of 1515 may be performed according to the methods described herein. In some examples, aspects of the operations of 1515 may be performed by an uplink PI monitoring component as described with reference to FIGS. 6 through 9.

At 1520, the UE may determine to monitor for uplink PIs based on a received indication. The operations of 1520 may be performed according to the methods described herein. In some examples, aspects of the operations of 1520 may be performed by an uplink PI receiver as described with reference to FIGS. 6 through 9.

Figure 16:
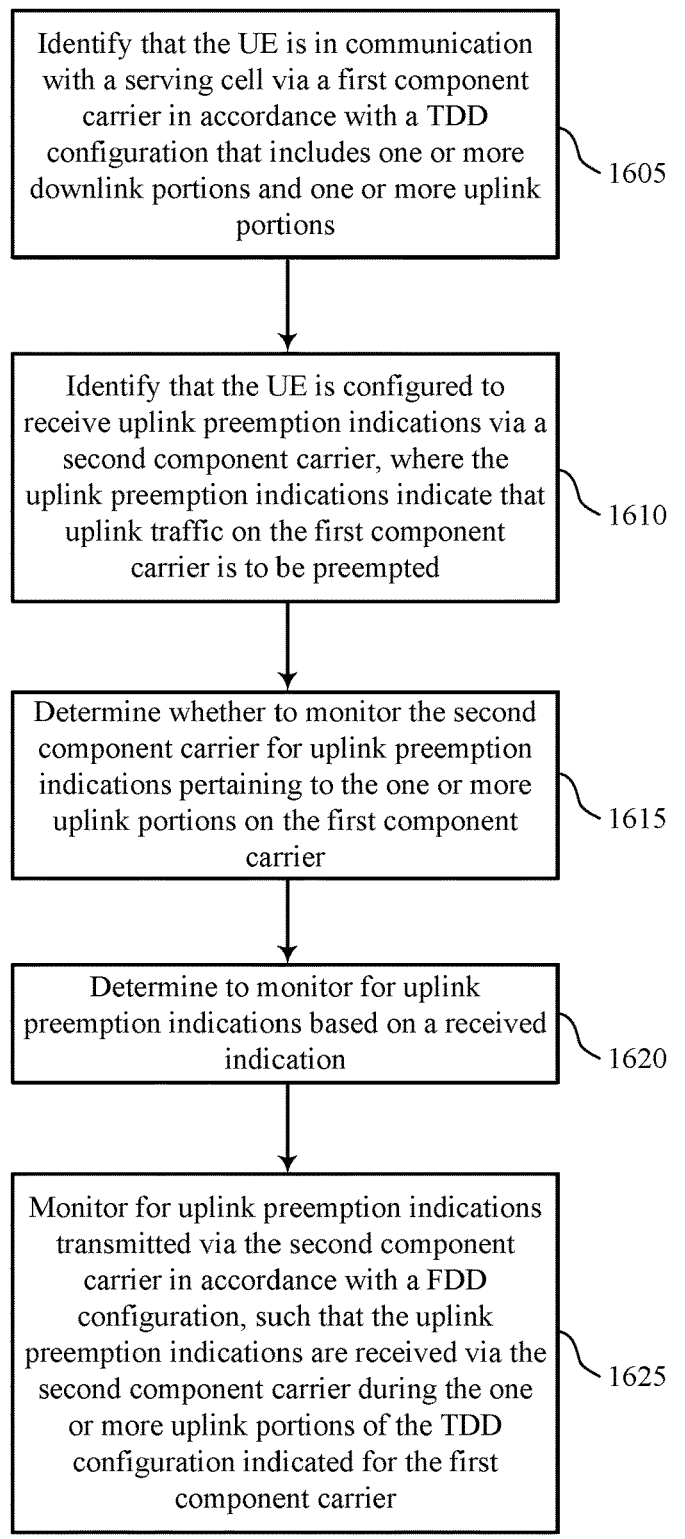

FIG. 16 shows a flowchart illustrating a method 1600 that supports monitoring for an uplink PI in accordance with aspects of the present disclosure. The operations of method 1600 may be implemented by a UE 115 or its components as described herein. For example, the operations of method 1600 may be performed by a UE preemption manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify that the UE is in communication with a serving cell via a first CC in accordance with a TDD configuration that includes one or more downlink portions and one or more uplink portions. The operations of 1605 may be performed according to the methods described herein. In some examples, aspects of the operations of 1605 may be performed by a TDD configuration component as described with reference to FIGS. 6 through 9.

At 1610, the UE may identify that the UE is configured to receive uplink PIs via a second CC (e.g., so that the uplink PIs may be received via the second CC while the UE is operating in at least one uplink portion of the one or more uplink portions of the TDD configuration identified for the first CC), where the uplink PIs indicate that uplink traffic on the first CC is to be preempted. The operations of 1610 may be performed according to the methods described herein. In some examples, aspects of the operations of 1610 may be performed by an uplink PI receiver as described with reference to FIGS. 6 through 9.

At 1615, the UE may determine whether to monitor the second component carrier for uplink PIs pertaining to the one or more uplink portions on the first CC. The operations of 1615 may be performed according to the methods described herein. In some examples, aspects of the operations of 1615 may be performed by an uplink PI monitoring component as described with reference to FIGS. 6 through 9.

At 1620, the UE may determine to monitor for uplink PIs based on a received indication. The operations of 1620 may be performed according to the methods described herein. In some examples, aspects of the operations of 1620 may be performed by an uplink PI receiver as described with reference to FIGS. 6 through 9.

At 1625, the UE may monitor for uplink PIs transmitted via the second CC in accordance with an FDD configuration, such that the uplink PIs are received via the second CC during the one or more uplink portions of the TDD configuration. The operations of 1625 may be performed according to the methods described herein. In some examples, aspects of the operations of 1625 may be performed by an FDD uplink PI component as described with reference to FIGS. 6 through 9.

Figure 17:
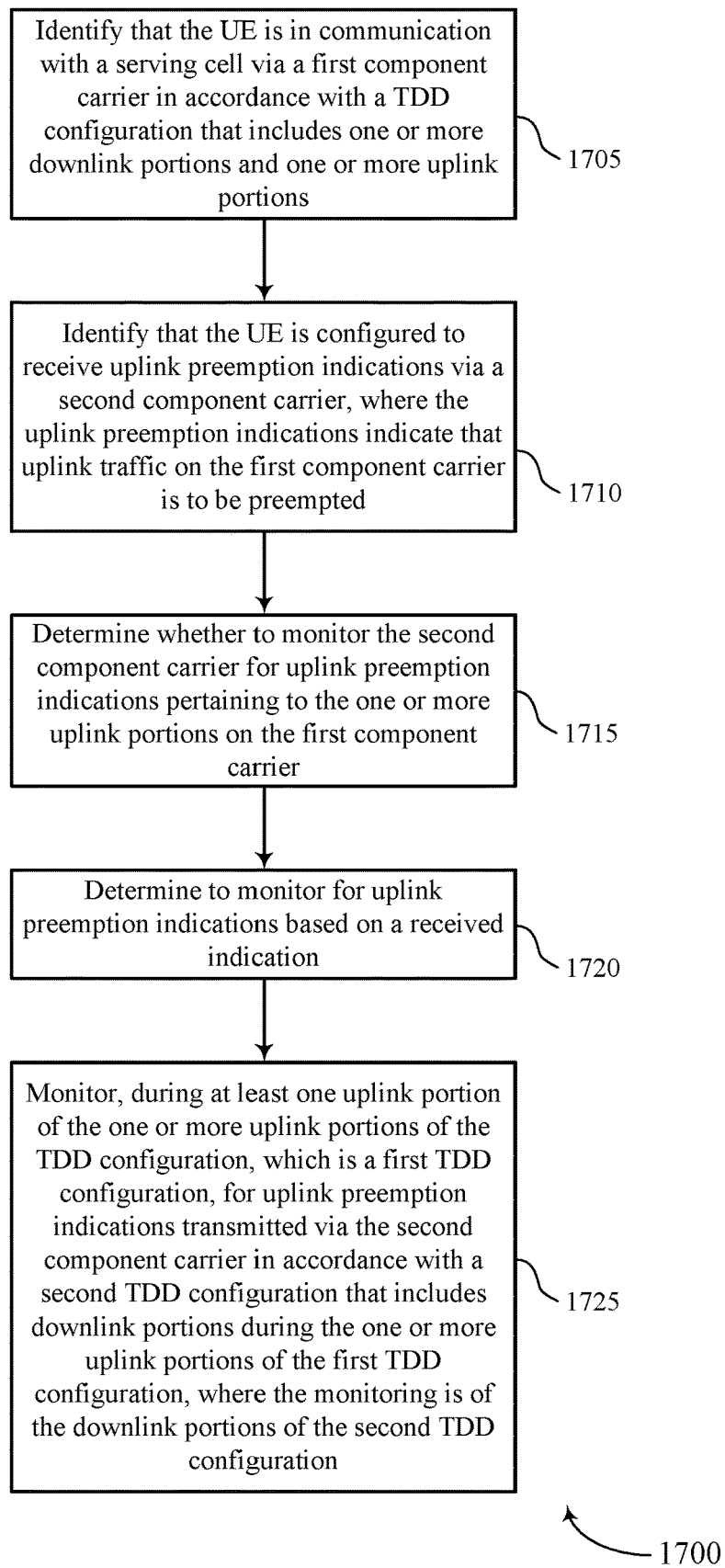

FIG. 17 shows a flowchart illustrating a method 1700 that supports monitoring for an uplink PI in accordance with aspects of the present disclosure. The operations of method 1700 may be implemented by a UE 115 or its components as described herein. For example, the operations of method 1700 may be performed by a UE preemption manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may identify that the UE is in communication with a serving cell via a first CC in accordance with a TDD configuration that includes one or more downlink portions and one or more uplink portions. The operations of 1705 may be performed according to the methods described herein. In some examples, aspects of the operations of 1705 may be performed by a TDD configuration component as described with reference to FIGS. 6 through 9.

At 1710, the UE may identify that the UE is configured to receive uplink PIs via a second CC (e.g., so that the uplink PIs may be received via the second CC while the UE is operating in at least one uplink portion of the one or more uplink portions of the TDD configuration identified for the first CC), where the uplink PIs indicate that uplink traffic on the first CC is to be preempted. The operations of 1710 may be performed according to the methods described herein. In some examples, aspects of the operations of 1710 may be performed by an uplink PI receiver as described with reference to FIGS. 6 through 9.

At 1715, the UE may determine whether to monitor the second component carrier for uplink PIs pertaining to the one or more uplink portions on the first CC. The operations of 1715 may be performed according to the methods described herein. In some examples, aspects of the operations of 1715 may be performed by an uplink PI monitoring component as described with reference to FIGS. 6 through 9.

At 1720, the UE may determine to monitor for uplink PIs based on a received indication. The operations of 1720 may be performed according to the methods described herein. In some examples, aspects of the operations of 1720 may be performed by an uplink PI receiver as described with reference to FIGS. 6 through 9.

At 1725, the UE may monitor, during at least one uplink portion of the one or more uplink portions of the TDD configuration one or more uplink portions of the TDD configuration identified for the first CC), which is a first TDD configuration, for uplink PIs transmitted via the second CC in accordance with a second TDD configuration that includes downlink portions during the one or more uplink portions of the first TDD configuration, where the monitoring is of the downlink portions of the second TDD configuration. The operations of 1725 may be performed according to the methods described herein. In some examples, aspects of the operations of 1725 may be performed by a complementary TDD component as described with reference to FIGS. 6 through 9.

Figure 18:
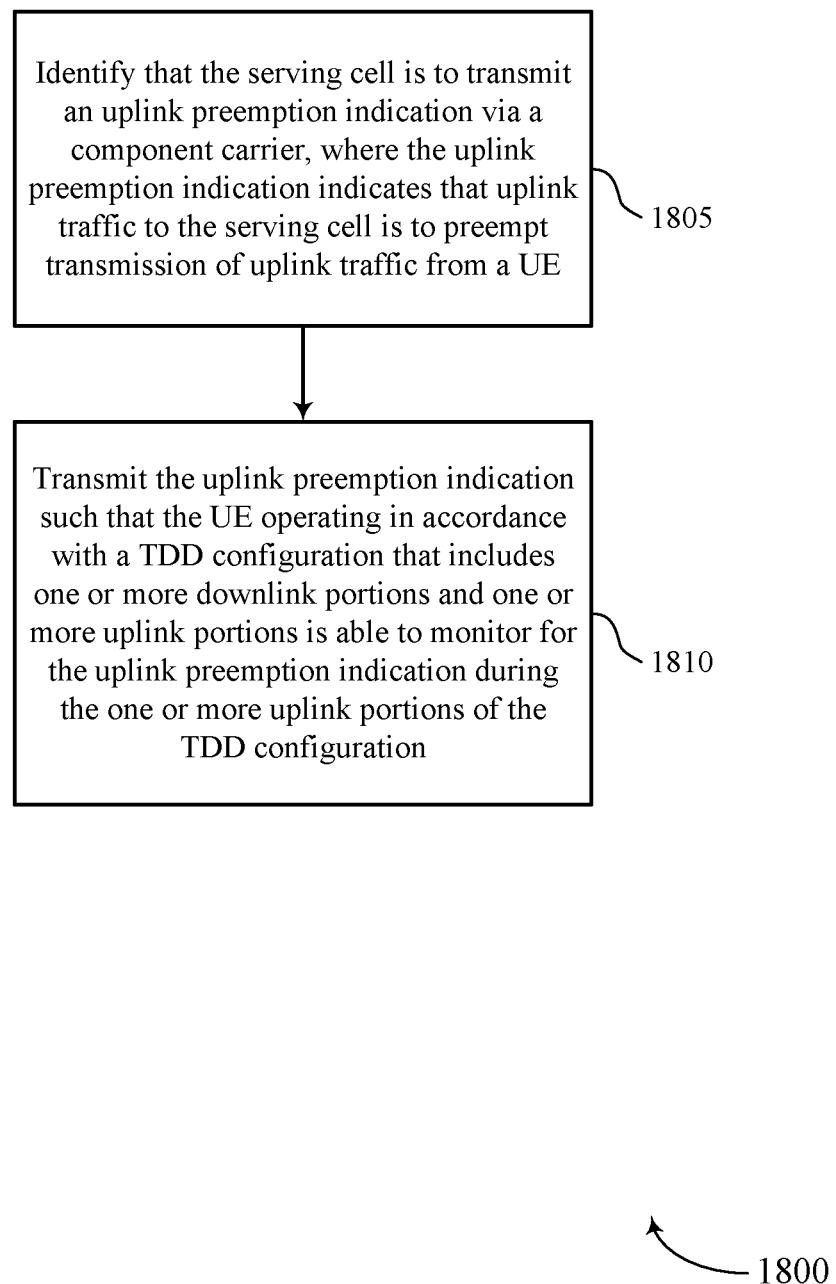

FIG. 18 shows a flowchart illustrating a method 1800 that supports monitoring for an uplink PI in accordance with aspects of the present disclosure. The operations of method 1800 may be implemented by a base station 105, a serving cell 105, a similar cell 105, or its components as described herein. For example, the operations of method 1800 may be performed by a cell preemption manager as described with reference to FIGS. 10 through 13. In some examples, a serving cell (e.g., a base station) may execute a set of instructions to control the functional elements of the serving cell to perform the functions described below. Additionally or alternatively, a serving cell may perform aspects of the functions described below using special-purpose hardware.

At 1805, the serving cell may identify that the serving cell is to transmit an uplink PI via a CC, where the uplink PI indicates that uplink traffic to the serving cell is to preempt transmission of uplink traffic from a UE. The operations of 1805 may be performed according to the methods described herein. In some examples, aspects of the operations of 1805 may be performed by an uplink preemption identifier as described with reference to FIGS. 10 through 13.

At 1810, the serving cell may transmit the uplink PI such that the UE operating in accordance with a TDD configuration that includes one or more downlink portions and one or more uplink portions is able to monitor for the uplink PI during the one or more uplink portions of the TDD configuration. The operations of 1810 may be performed according to the methods described herein. In some examples, aspects of the operations of 1810 may be performed by an uplink PI transmitter as described with reference to FIGS. 10 through 13.

Figure 19:
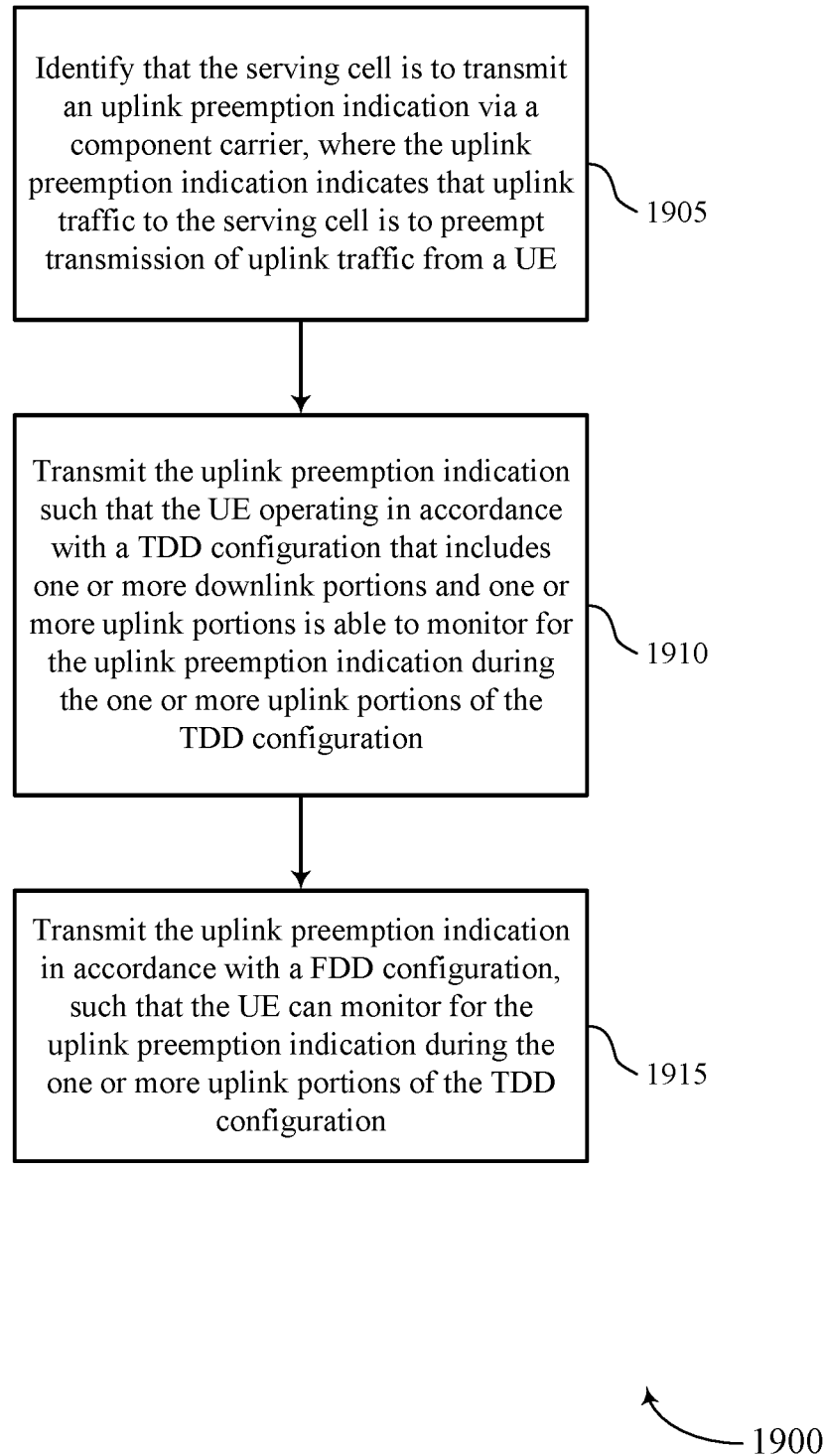

FIG. 19 shows a flowchart illustrating a method 1900 that supports monitoring for an uplink PI in accordance with aspects of the present disclosure. The operations of method 1900 may be implemented by a base station 105, a serving cell 105, a similar cell 105 or its components as described herein. For example, the operations of method 1900 may be performed by a cell preemption manager as described with reference to FIGS. 10 through 13. In some examples, a serving cell (e.g., a base station) may execute a set of instructions to control the functional elements of the serving cell to perform the functions described below. Additionally or alternatively, a serving cell may perform aspects of the functions described below using special-purpose hardware.

At 1905, the serving cell may identify that the serving cell is to transmit an uplink PI via a CC, where the uplink PI indicates that uplink traffic to the serving cell is to preempt transmission of uplink traffic from a UE. The operations of 1905 may be performed according to the methods described herein. In some examples, aspects of the operations of 1905 may be performed by an uplink preemption identifier as described with reference to FIGS. 10 through 13.

At 1910, the serving cell may transmit the uplink PI such that the UE operating in accordance with a TDD configuration that includes one or more downlink portions and one or more uplink portions is able to monitor for the uplink PI during the one or more uplink portions of the TDD configuration. The operations of 1910 may be performed according to the methods described herein. In some examples, aspects of the operations of 1910 may be performed by an uplink PI transmitter as described with reference to FIGS. 10 through 13.

At 1915, the serving cell may transmit the uplink PI in accordance with an FDD configuration, such that the UE can monitor for the uplink PI during the one or more uplink portions of the TDD configuration. The operations of 1915 may be performed according to the methods described herein. In some examples, aspects of the operations of 1915 may be performed by an FDD uplink PI transmitter as described with reference to FIGS. 10 through 13.

Figure 20:
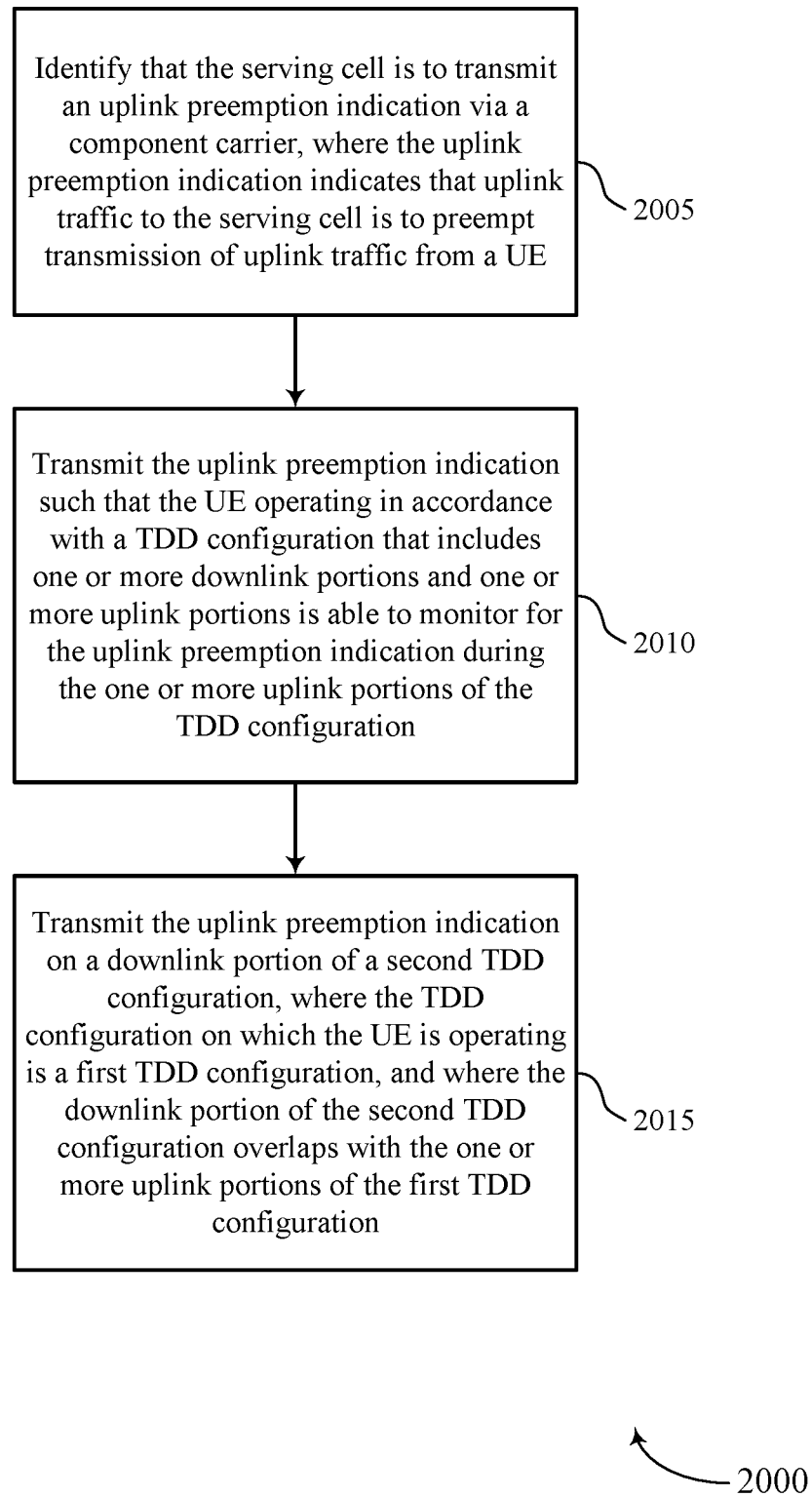

FIG. 20 shows a flowchart illustrating a method 2000 that supports monitoring for an uplink PI in accordance with aspects of the present disclosure. The operations of method 2000 may be implemented by a base station 105, a serving cell 105, a similar cell 105 or its components as described herein. For example, the operations of method 2000 may be performed by a cell preemption manager as described with reference to FIGS. 10 through 13. In some examples, a serving cell (e.g., a base station) may execute a set of instructions to control the functional elements of the serving cell to perform the functions described below. Additionally or alternatively, a serving cell may perform aspects of the functions described below using special-purpose hardware.

At 2005, the serving cell may identify that the serving cell is to transmit an uplink PI via a CC, where the uplink PI indicates that uplink traffic to the serving cell is to preempt transmission of uplink traffic from a UE. The operations of 2005 may be performed according to the methods described herein. In some examples, aspects of the operations of 2005 may be performed by an uplink preemption identifier as described with reference to FIGS. 10 through 13.

At 2010, the serving cell may transmit the uplink PI such that the UE operating in accordance with a TDD configuration that includes one or more downlink portions and one or more uplink portions is able to monitor for the uplink PI during the one or more uplink portions of the TDD configuration. The operations of 2010 may be performed according to the methods described herein. In some examples, aspects of the operations of 2010 may be performed by an uplink PI transmitter as described with reference to FIGS. 10 through 13.

At 2015, the serving cell may transmit the uplink PI on a downlink portion of a second TDD configuration, where the TDD configuration on which the UE is operating is a first TDD configuration, and where the downlink portion of the second TDD configuration overlaps with the one or more uplink portions of the first TDD configuration. The operations of 2015 may be performed according to the methods described herein. In some examples, aspects of the operations of 2015 may be performed by a complementary TDD uplink PI transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying that the UE is in communication with a serving cell via a first component carrier in accordance with a time division duplexing (TDD) configuration that includes one or more downlink portions and one or more uplink portions;
   identifying that the UE is configured to receive uplink preemption indications via a second component carrier, wherein the uplink preemption indications indicate that uplink traffic on the first component carrier is to be preempted; and
   determining whether to monitor the second component carrier for uplink preemption indications pertaining to the one or more uplink portions on the first component carrier.

2. The method of claim 1, wherein determining whether to monitor the second component carrier for uplink preemption indications pertaining to the one or more uplink portions on the first component carrier comprises:
   determining to monitor the second component carrier for uplink preemption indications based at least in part on a received indication.

3. The method of claim 2, further comprising:
   monitoring for uplink preemption indications transmitted via the second component carrier in accordance with a frequency division duplexing (FDD) configuration, such that the uplink preemption indications are received via the second component carrier during the one or more uplink portions of the TDD configuration indicated for the first component carrier.

4. The method of claim 2, further comprising:
   monitoring, during at least one uplink portion of the one or more uplink portions of the TDD configuration, which is a first TDD configuration, for uplink preemption indications transmitted via the second component carrier in accordance with a second TDD configuration that includes downlink portions during the one or more uplink portions of the first TDD configuration, wherein the monitoring is of the downlink portions of the second TDD configuration.

5. The method of claim 2, further comprising:
   monitoring for uplink preemption indications via both the first component carrier and the second component carrier during the one or more downlink portions of the TDD configuration; and
   monitoring for uplink preemption indications via the second component carrier during the one or more uplink portions on the first component carrier.

6. The method of claim 2, further comprising:
   monitoring for uplink preemption indications via the first component carrier during the one or more downlink portions of the TDD configuration; and
   refraining from monitoring for uplink preemption indications via the second component carrier during at least one downlink portion of the one or more downlink portions of the TDD configuration; and
   monitoring for uplink preemption indications via the second component carrier during at least one uplink portion of the one or more uplink portions on the first component carrier.

7. The method of claim 1, wherein determining whether to monitor the second component carrier for uplink preemption indications pertaining to the one or more uplink portions on the first component carrier comprises:
   identifying that at least some uplink timing parameters are indicated to the UE in terms of symbols; and
   determining to refrain from monitoring for uplink preemption indications based at least in part on the at least some uplink timing parameters being indicated in terms of symbols and being within a threshold amount of an uplink preemption indication timing.

8. The method of claim 7, wherein identifying that the at least some uplink timing parameters are indicated to the UE in terms of symbols comprises:
   receiving an explicit indication of the at least some uplink timing parameters via either radio resource control signaling or downlink control information signaling.

9. The method of claim 7, wherein identifying that the at least some uplink timing parameters are indicated to the UE in terms of symbols comprises:
   identifying the at least some uplink timing parameters based at least in part on a number of associated resource blocks, a number of associated component carriers, a number of associated layers, a number of associated control symbols, a location of a demodulation reference signal, or combinations thereof.

10. The method of claim 7, wherein determining to refrain from monitoring for uplink preemption indications comprises:
    determining to refrain from monitoring for uplink preemption indications on a per component carrier basis.

11. The method of claim 1, wherein determining whether to monitor the second component carrier for uplink preemption indications pertaining to the one or more uplink portions on the first component carrier comprises:
    identifying that a collision between an uplink transmission of the UE during the one or more uplink portions and a preempting uplink transmission of another UE during the same one or more uplink portions is not expected; and determining to refrain from monitoring for uplink preemption indications based at least in part on an expectation that no collisions will occur during the one or more uplink portions.

12. The method of claim 11, wherein identifying that a collision is not expected comprises:
identifying that a timeline for communications by the other UE precludes uplink transmissions during the one or more uplink portions.

13. The method of claim 11, wherein identifying that a collision is not expected comprises:
identifying that the UE is not scheduled to transmit an uplink transmission during the one or more uplink portions.

14. The method of claim 11, wherein identifying that a collision is not expected comprises:
identifying that the one or more uplink portions are anchor slots for lower priority traffic, such that higher priority traffic is not allowed to preempt lower priority traffic during the anchor slots.

15. The method of claim 1, wherein determining whether to monitor the second component carrier for uplink preemption indications pertaining to the one or more uplink portions on the first component carrier comprises:
identifying that the UE is near a cell edge of the serving cell; and
determining to refrain from monitoring for uplink preemption indications based at least in part on the UE being near the cell edge of the serving cell.

16. The method of claim 15, wherein identifying that the UE is near the cell edge of the serving cell comprises:
determining whether communications between the UE and the serving cell satisfy a path-loss threshold, or whether an estimate of an uplink receive power of uplink transmissions by the UE to the serving cell satisfy an uplink receive power threshold.

17. The method of claim 1, wherein the uplink preemption indications are received as part of a multicast message.

18. The method of claim 17, wherein the multicast message is associated with either a timing advance group or a transmit power control group.

19. The method of claim 1, wherein the uplink preemption indications are indicated via a same downlink control information message that is used to indicate downlink preemption indications.

20. The method of claim 1, wherein the uplink preemption indications are indicated via a first downlink control information message that is different from a second downlink control information message used to indicate downlink preemption indications.

21. The method of claim 1, wherein the uplink preemption indications include a smaller payload than downlink preemption indications.

22. The method of claim 1, wherein the uplink preemption indications are coded via Reed-Muller coding.

23. The method of claim 1, further comprising:
receiving an uplink preemption indication if the UE determines to monitor for uplink preemption indications during the one or more uplink portions; and
identifying whether to ignore the uplink preemption indication, refrain from transmitting an uplink transmission based on receiving the uplink preemption indication, or reduce an uplink transmission power based on receiving the uplink preemption indication.

24. The method of claim 23, further comprising:
receiving, via radio resource control signaling, an indication of an amount by which the uplink transmission power is to be reduced.

25. The method of claim 23, wherein the uplink preemption indication further indicates in which slot the UE is to refrain from transmitting an uplink transmission.

26. An apparatus for wireless communication at a user equipment (UE), comprising:
a processor,
memory coupled with the processor; and
instructions stored in the memory and executable by the processor to cause the apparatus to:
identify that the UE is in communication with a serving cell via a first component carrier in accordance with a time division duplexing (TDD) configuration that includes one or more downlink portions and one or more uplink portions;
identify that the UE is configured to receive uplink preemption indications via a second component carrier, wherein the uplink preemption indications indicate that uplink traffic on the first component carrier is to be preempted; and
determine whether to monitor the second component carrier for uplink preemption indications pertaining to the one or more uplink portions on the first component carrier.

27. The apparatus of claim 26, wherein the instructions to determine whether to monitor the second component carrier for uplink preemption indications pertaining to the one or more uplink portions on the first component carrier are executable by the processor to cause the apparatus to:
determine to monitor the second component carrier for uplink preemption indications based at least in part on a received indication.

28. The apparatus of claim 26, wherein the instructions to determine whether to monitor the second component carrier for uplink preemption indications pertaining to the one or more uplink portions on the first component carrier are executable by the processor to cause the apparatus to:
identify that at least some uplink timing parameters are indicated to the UE in terms of symbols; and
determine to refrain from monitoring for uplink preemption indications based at least in part on the at least some uplink timing parameters being indicated in terms of symbols and being within a threshold amount of an uplink preemption indication timing.

29. An apparatus for wireless communication at a user equipment (UE), comprising:
means for identifying that the UE is in communication with a serving cell via a first component carrier in accordance with a time division duplexing (TDD) configuration that includes one or more downlink portions and one or more uplink portions;
means for identifying that the UE is configured to receive uplink preemption indications via a second component carrier, wherein the uplink preemption indications indicate that uplink traffic on the first component carrier is to be preempted; and
means for determining whether to monitor the second component carrier for uplink preemption indications pertaining to the one or more uplink portions on the first component carrier.

30. A non-transitory computer-readable medium storing code for wireless communication at a user equipment (UE), the code comprising instructions executable by a processor to:

identify that the UE is in communication with a serving cell via a first component carrier in accordance with a time division duplexing (TDD) configuration that includes one or more downlink portions and one or more uplink portions;

identify that the UE is configured to receive uplink preemption indications via a second component carrier, wherein the uplink preemption indications indicate that uplink traffic on the first component carrier is to be preempted; and determine whether to monitor the second component carrier for uplink preemption indications pertaining to the one or more uplink portions on the first component carrier.

* * * * *